United States Patent
Zowarka et al.

(10) Patent No.: US 10,125,589 B2
(45) Date of Patent: Nov. 13, 2018

(54) DOWNHOLE INDUCTION HEATER AND COUPLING SYSTEM FOR OIL AND GAS WELLS

(71) Applicant: The Board of Regents of The University of Texas System, Austin, TX (US)

(72) Inventors: Raymond C. Zowarka, Austin, TX (US); Mukul M. Sharma, Austin, TX (US); Michael D. Werst, Manor, TX (US); Clay Hearn, Austin, TX (US); Michael Worthington, Spicewood, TX (US); Jon Hahne, Georgetown, TX (US); Hsing-Pang Liu, Austin, TX (US); Bryan Bunkowski, Austin, TX (US); Siddharth Pratap, Orange, CA (US)

(73) Assignee: Board of Regents of the University of Texas System, Austin, TX (US)

( * ) Notice: Subject to any disclaimer, the term of this patent is extended or adjusted under 35 U.S.C. 154(b) by 1 day.

(21) Appl. No.: 15/606,266

(22) Filed: May 26, 2017

(65) Prior Publication Data
US 2017/0362923 A1    Dec. 21, 2017

Related U.S. Application Data

(60) Provisional application No. 62/342,423, filed on May 27, 2016.

(51) Int. Cl.
*E21B 43/24* (2006.01)
*E21B 36/04* (2006.01)
(Continued)

(52) U.S. Cl.
CPC .......... *E21B 43/2401* (2013.01); *E21B 36/04* (2013.01); *E21B 43/127* (2013.01);
(Continued)

(58) Field of Classification Search
CPC .... E21B 43/2401; E21B 43/127; E21B 36/04; F16H 2025/2028; F16L 53/34; H05B 6/10; H01F 7/0205
See application file for complete search history.

(56) References Cited

U.S. PATENT DOCUMENTS

| | | |
|---|---|---|
| 2,548,360 A | 4/1951 | Germain |
| 4,570,715 A | 2/1986 | Van Meurs et al. |

(Continued)

FOREIGN PATENT DOCUMENTS

WO    2010/114180    10/2010

OTHER PUBLICATIONS

International Search Report and Written Opinion for PCT/US17/34716 dated Aug. 25, 2017 pp. 10.
(Continued)

*Primary Examiner* — Robert E Fuller
*Assistant Examiner* — Christopher J Sebesta
(74) *Attorney, Agent, or Firm* — Meyertons, Hood, Kivlin, Kowert & Goetzel, P.C.

(57) ABSTRACT

Described herein are methods and system that use electromagnetic heating to heat wellbores and the fluids therein. The heating is achieved by placing one or more permanent magnets in the wellbore and moving a metallic component and/or the one or more permanent magnets relative to each other. This generates eddy currents in the metallic component, which heat the metallic component. This heat is transferred to the fluids in the wellbore from the metallic component by convection. In some embodiments, permanent magnets are installed in the tubing to induce eddy current heating in a well by converting the linear motion of a sucker rod to rotary motion of a conducting tube using a (Continued)

lead or ball screw. The heater may directly integrate with existing pump jack equipment with little or no additional infrastructure required.

22 Claims, 22 Drawing Sheets

(51) Int. Cl.
*E21B 43/12* (2006.01)
*H05B 6/10* (2006.01)
*F16H 25/20* (2006.01)
*F16L 53/34* (2018.01)

(52) U.S. Cl.
CPC ....... *H05B 6/10* (2013.01); *F16H 2025/2028* (2013.01); *F16L 53/34* (2018.01)

(56) References Cited

U.S. PATENT DOCUMENTS

| | | | |
|---|---|---|---|
| 4,716,960 A | | 1/1988 | Eastlund et al. |
| 5,052,491 A | | 10/1991 | Harms |
| 5,065,818 A | | 11/1991 | Van Egmond |
| 5,070,533 A | * | 12/1991 | Bridges .................. E21B 36/04 166/60 |
| 5,465,789 A | * | 11/1995 | Evans ................. E21B 43/2401 166/248 |
| 6,011,245 A | * | 1/2000 | Bell ........................ F28D 15/02 219/631 |
| 6,023,554 A | | 2/2000 | Vinegar et al. |
| 6,086,339 A | | 7/2000 | Jacen |
| 6,285,014 B1 | * | 9/2001 | Beck ....................... E21B 36/04 166/248 |
| 6,297,484 B1 | | 10/2001 | Usui et al. |
| 6,353,706 B1 | * | 3/2002 | Bridges .................. E21B 36/04 166/302 |
| 8,162,059 B2 | | 4/2012 | Nguyen et al. |
| 8,875,788 B2 | | 11/2014 | Nguyen et al. |
| 2009/0160445 A1 | * | 6/2009 | Hall ........................ G01V 3/28 324/339 |
| 2010/0089574 A1 | * | 4/2010 | Wideman ................. E21B 7/14 166/272.1 |
| 2011/0272399 A1 | * | 11/2011 | Berdut-Teruel ........ H05B 6/108 219/672 |
| 2013/0192682 A1 | * | 8/2013 | Freese ..................... F16L 55/00 137/13 |
| 2016/0265325 A1 | | 9/2016 | Sharma et al. |

OTHER PUBLICATIONS

International Search Report/Written Opinion for PCT Application No. PCT/US2016/017749 dated Apr. 22, 2016.
Non Final Office Action for U.S. Appl. No. 15/042,771 dated Feb. 26, 2018.
Final Office Action for U.S. Appl. No. 15/042,771 dated Jul. 13, 2018.

* cited by examiner

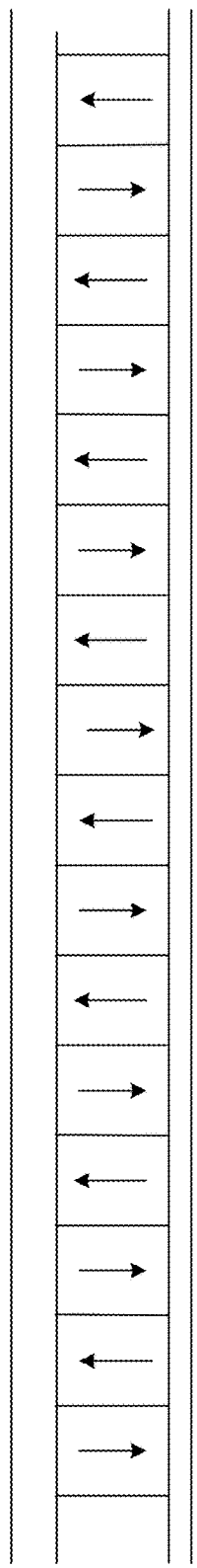
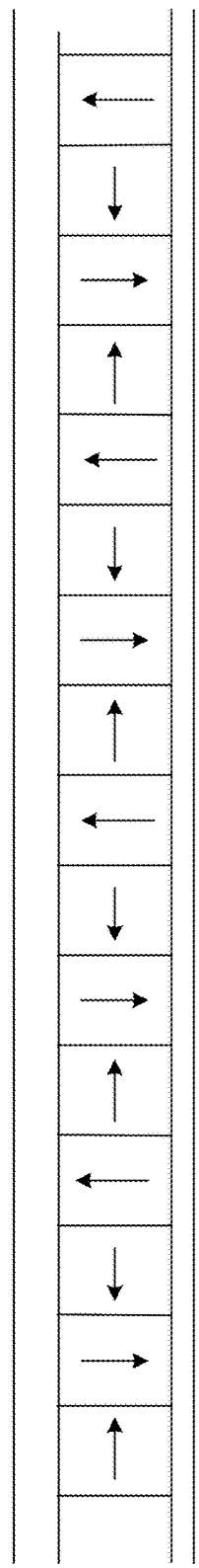
*FIG. 2A*  *FIG. 2B*

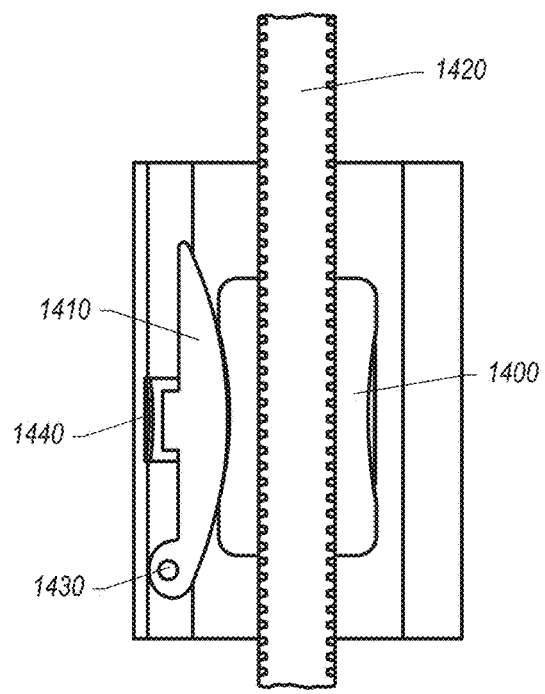
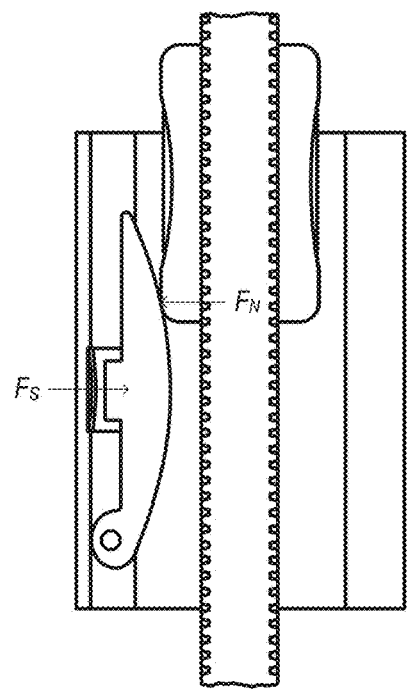
FIG. 14         FIG. 15
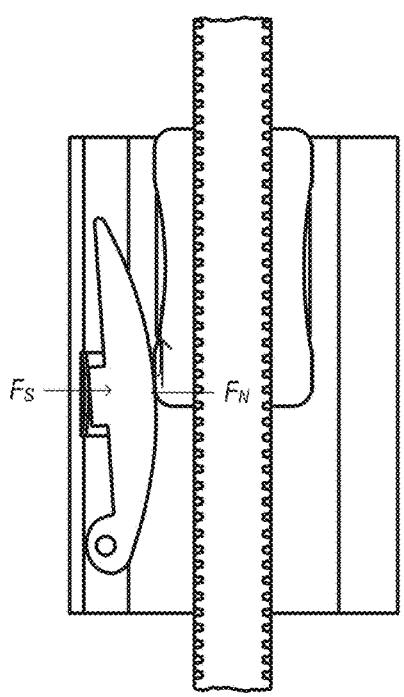
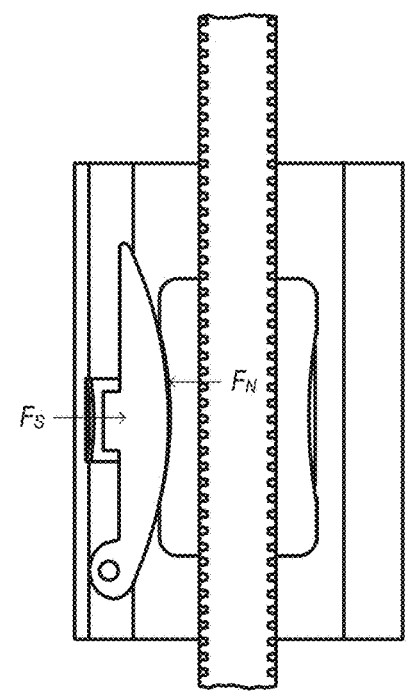
FIG. 16         FIG. 17

DOWNHOLE INDUCTION HEATER AND COUPLING SYSTEM FOR OIL AND GAS WELLS

PRIORITY CLAIM

This application claims priority to U.S. Provisional Application Ser. No. 62/342,423 entitled "DOWNHOLE INDUCTION HEATER AND COUPLING SYSTEM FOR OIL AND GAS WELLS" filed May 27, 2016, which is incorporated herein by reference in its entirety.

BACKGROUND

1. Field of the Invention

The invention generally relates to methods of generating heat in oil or gas wells using electromagnetic heating.

2. Description of the Relevant Art

Hydrocarbons obtained from subterranean (e.g., sedimentary) formations are often used as energy resources, as feedstocks, and as consumer products. Concerns over depletion of available hydrocarbon resources and concerns over declining overall quality of produced hydrocarbons have led to development of processes for more efficient recovery, processing and/or use of available hydrocarbon resources. In situ processes may be used to remove hydrocarbon materials from subterranean formations. Chemical and/or physical properties of hydrocarbon material in a subterranean formation may need to be changed to allow hydrocarbon material to be more easily removed from the subterranean formation. The chemical and physical changes may include in situ reactions that produce removable fluids, composition changes, solubility changes, density changes, phase changes, and/or viscosity changes of the hydrocarbon material in the formation. A fluid may be, but is not limited to, a gas, a liquid, an emulsion, a slurry, and/or a stream of solid particles that has flow characteristics similar to liquid flow.

A heat source may be used to heat a subterranean formation and/or the tubing and/or casing disposed in a wellbore. Electric heaters may be used to heat the subterranean formation by radiation and/or conduction and/or convection. An electric heater may resistively heat an element. U.S. Pat. No. 2,548,360 to Germain, which is incorporated by reference as if fully set forth herein, describes an electric heating element placed in a viscous oil in a wellbore. The heater element heats and thins the oil to allow the oil to be pumped from the wellbore. U.S. Pat. No. 4,716,960 to Eastlund et al., which is incorporated by reference as if fully set forth herein, describes electrically heating tubing of a petroleum well by passing a relatively low voltage current through the tubing to prevent formation of solids. U.S. Pat. No. 5,065,818 to Van Egmond, which is incorporated by reference as if fully set forth herein, describes an electric heating element that is cemented into a well borehole without a casing surrounding the heating element.

U.S. Pat. No. 6,023,554 to Vinegar et al., which is incorporated by reference as if fully set forth herein, describes an electric heating element that is positioned in a casing. The heating element generates radiant energy that heats the casing. A granular solid fill material may be placed between the casing and the formation. The casing may conductively heat the fill material, which in turn conductively heats the formation.

U.S. Pat. No. 4,570,715 to Van Meurs et al., which is incorporated by reference as if fully set forth herein, describes an electric heating element. The heating element has an electrically conductive core, a surrounding layer of insulating material, and a surrounding metallic sheath. The conductive core may have a relatively low resistance at high temperatures. The insulating material may have electrical resistance, compressive strength, and heat conductivity properties that are relatively high at high temperatures. The insulating layer may inhibit arcing from the core to the metallic sheath. The metallic sheath may have tensile strength and creep resistance properties that are relatively high at high temperatures.

All of these methods require that electrical power be transmitted hundreds of feet underground to provide power to the device. To run the electrical cables to the heating devices requires special connectors at the well head. In addition transformers and controllers are required at the surface to supply the underground power. Present technologies use the galvanic transmission of electricity from the surface to supply in well ohmic heaters. This requires cables to be fed down the well with the tubing string, surface transformers and controllers, and special penetrations of the well head and tubing hanger to accommodate the cables. The high cost of maintenance, and the difficulty in providing power hundreds of feet underground, makes other methods of providing heat to subterranean formations and tubing very desirable.

SUMMARY

Embodiments described herein relate to systems and methods for generating heat in an oil or gas well using electromagnetic heating. The heating, in one embodiment, is accomplished by creating relative motion between a set of magnets and a conducting surface. The relative motion will induce eddy currents heating the conducting surface. The conducting surface may be thermally coupled to the wellbore to provide heating to the fluids travelling through wellbore. The energy needed to create the relative motion may be provided by the moving components of a downhole pump system.

In one embodiment, an electromagnetic heating system for heating the interior of a wellbore, includes: one or more permanent magnets coupled to a down-well component of the wellbore and a metallic component positioned within the wellbore and magnetically coupled to the one or more permanent magnets. During use the metallic component and/or the permanent magnets are moved in a manner such that a current is generated in the metallic component, causing the temperature of the movable magnetic component to increase.

In some embodiments, either the metallic component or one or more permanent magnets may be moved in a linear direction relative to each other. The metallic component and/or the one or more permanent magnets may be coupled to a pump, positioned within the wellbore, such that the reciprocating motion of the pump causes the metallic component and/or the one or more permanent magnets to move in a linear direction with respect each other.

In some embodiments, either the metallic component or the one or more permanent magnets may be rotated relative to each other. The metallic component and/or the one or more permanent magnets may be coupled to a pump, positioned within the wellbore, such that the reciprocating motion of the pump causes the metallic component and/or the one or more permanent magnets to move in a linear direction with respect each other. A drive mechanism may be coupled to the pump, wherein the drive mechanism translates the linear motion of the pump into rotational movement of the metallic component or the magnets. The metallic component may be coupled to a pump, positioned within the wellbore, such that a reciprocating motion of the pump causes the metallic component to rotate with respect to the one or more permanent magnets. The heating system may include a drive mechanism coupled to the pump. The drive mechanism may translate the linear motion of the pump into rotational movement of the metallic component.

In some embodiments, the drive mechanism may include an engager comprising an opening which couples, during use, to a portion of an elongated member coupled to the pump. The opening of the engager may be threaded. The portion of the elongated member may include a threaded portion complementary to the threaded opening of the engager. The threaded portion may include a tapered threading such that the threaded portion is self-starting during use when the threaded portion engages the threaded opening.

In some embodiments, the drive mechanism may include an engager comprising an opening which couples, during use, to a portion of an elongated member coupled to the pump. In some embodiments, the drive mechanism may include an engager comprising a threaded opening which couples, during use, to a threaded portion of an elongated member coupled to the pump. The engager may include at least two depressions. The drive mechanism may include at least two levers comprising a raised portion which engage, during use, the at least two depressions. The at least two levers may be positionable such that the raised portion conveys, during use, over at least one end of the engager.

In some embodiments, the at least two levers comprise a pivot point which allow movement of the at least two levers, and wherein the at least two levers comprise a resilient member which allows movement of the at least two levers while exerting an outward force on the levers away from an inner surface of wellbore.

In some embodiments, an insertion force is required for the engager to engage the at least two levers is greater than an operating force required to operate the drive mechanism coupled to the pump translating the linear motion of the pump into rotational movement of the metallic component. The insertion force may be adjusted by adjusting and/or replacing the resilient member.

In some embodiments, the drive mechanism translates the linear motion of the pump into rotational movement of the metallic component when the pump is moving in a first direction only. In some embodiments, the heating system may include a pump coupler which couples the drive mechanism to the elongated member. The pump coupler may engage the elongated member when travelling in the first direction.

In some embodiments, the drive mechanism translates the linear motion of the pump into rotational movement of the metallic component when the pump is moving in a first direction and a second direction, wherein the second direction is substantially opposite to the first direction. In some embodiments, the heating system may include a pump coupler which couples the drive mechanism to the elongated member. The pump coupler may engage the elongated member when travelling in the first and second directions.

In some embodiments, the heating system may include a torque coupling coupled to the pump. The torque coupler may transfer torque applied to the elongated member to a tubing string coupled to the drive mechanism.

In one embodiment, the one or more permanent magnets include a plurality of permanent magnets placed in a cylindrical or linear arrangement having alternately placed north-south poles. The one or more permanent magnets may be placed in a linear or cylindrical Halbach array.

In one embodiment the system includes a downhole motor coupled to the metallic components and/or the magnets, wherein the downhole motor moves the metallic component and/or the permanent magnets in a manner such that a current is generated in the metallic component.

In another embodiment, a drive mechanism is coupled to the metallic component and/or the permanent magnets, wherein the drive mechanism utilizes fluid pressures within the wellbore to move the metallic component and/or the permanent magnets in a manner such that a current is generated in the metallic component.

In another embodiment, a drive mechanism coupled to the metallic component and/or the permanent magnets, wherein the drive mechanism utilizes fluid velocities within the wellbore to move the metallic component and/or the permanent magnets in a manner such that a current is generated in the metallic component.

In one embodiment, the one or more permanent magnets are coupled to a tubing string of a downhole pump. In another embodiment, the one or more permanent magnets are magnetically coupled to a casing of a wellbore.

In an embodiment, a method of heating components within a wellbore comprises: placing an electromagnetic heating system as described above into a wellbore and moving the metallic component and/or the permanent magnets in a manner such that a current is generated in the metallic component.

BRIEF DESCRIPTION OF THE DRAWINGS

Advantages of the present invention will become apparent to those skilled in the art with the benefit of the following detailed description of embodiments and upon reference to the accompanying drawings in which:

FIG. 2A depicts an exploded view of the permanent magnets of the schematic diagram of FIG. 2, with the permanent magnets in a linear arrangement having alternately placed north-south poles;

FIG. 2B depicts an exploded view of the permanent magnets of the schematic diagram of FIG. 2, with the permanent magnets in a linear Halbach array;

FIGS. 14-20 depict an embodiment of a lever spring coupler during use at various stages.

Figure 1:
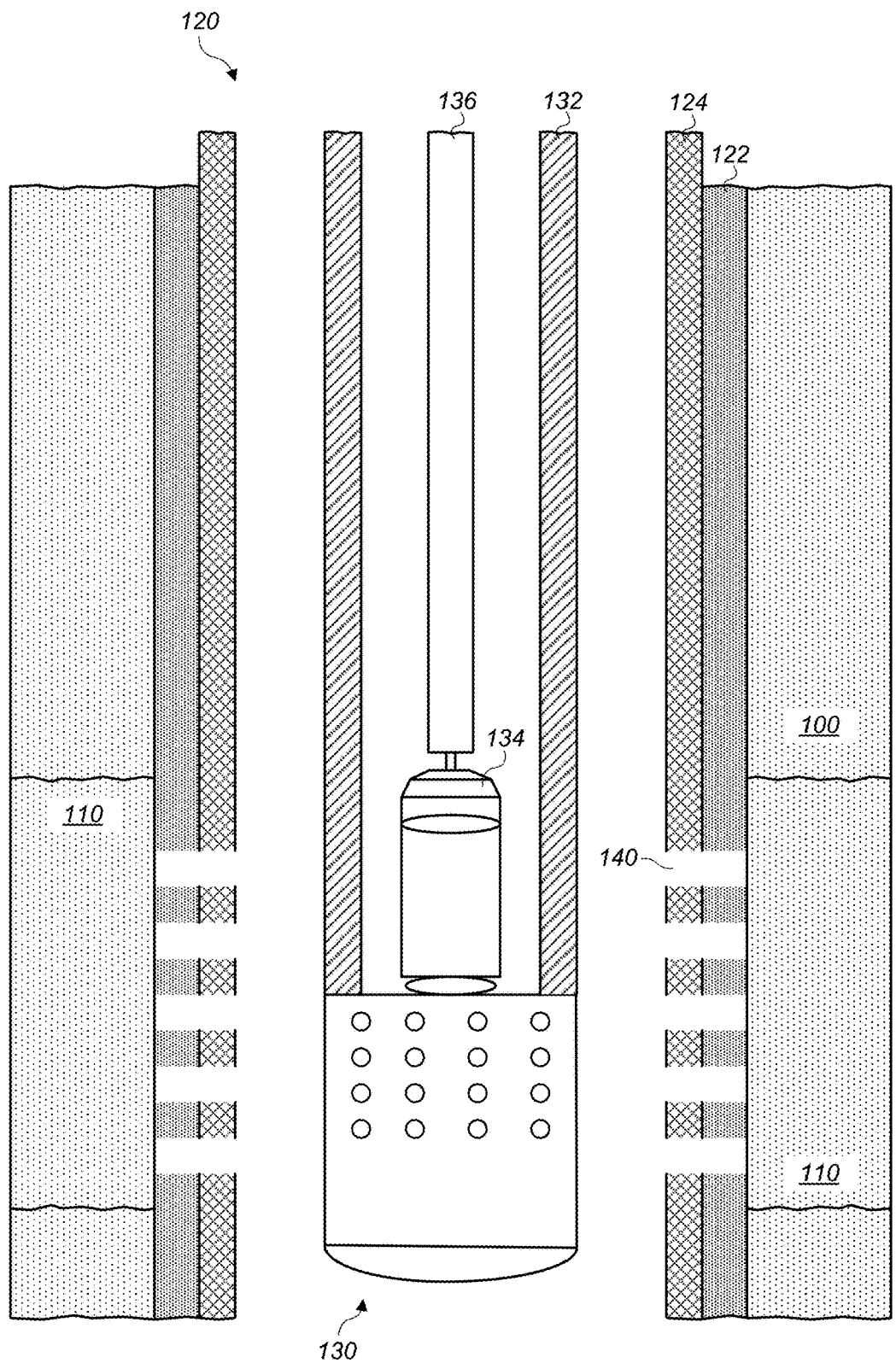
FIG. 1 depicts a typical hydraulic pump disposed in a casing within a subterranean formation.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The following description generally relates to systems and methods for extracting hydrocarbons from subterranean formations.

"Hydrocarbons" are generally defined as molecules formed primarily by carbon and hydrogen atoms. Hydrocarbons may also include other elements such as, but not limited to, halogens, metallic elements, nitrogen, oxygen, and/or sulfur. Hydrocarbons may be, but are not limited to, kerogen, bitumen, pyrobitumen, oils, natural mineral waxes, and asphaltites. Hydrocarbons may be located in or adjacent to mineral matrices in the earth. Matrices may include, but are not limited to, sedimentary rock, sands, silicilytes, carbonates, diatomites, and other porous media. "Hydrocarbon fluids" are fluids that include hydrocarbons. Hydrocarbon fluids may include, entrain, or be entrained in non-hydrocarbon fluids such as hydrogen, nitrogen, carbon monoxide, carbon dioxide, hydrogen sulfide, water, and ammonia.

A "formation" includes one or more hydrocarbon containing layers, one or more non-hydrocarbon layers, an overburden, and/or an underburden. The "overburden" and/or the "underburden" include one or more different types of impermeable materials. For example, overburden and/or underburden may include rock, shale, mudstone, or wet/tight carbonate. In some embodiments of in situ conversion processes, the overburden and/or the underburden may include a hydrocarbon containing layer or hydrocarbon containing layers that are relatively impermeable and are not subjected to temperatures during in situ conversion processing that result in significant characteristic changes of the hydrocarbon containing layers of the overburden and/or the underburden. For example, the underburden may contain shale or mudstone, but the underburden is not allowed to heat to pyrolysis temperatures during the in situ conversion process. In some cases, the overburden and/or the underburden may be somewhat permeable.

"Formation fluids" and "produced fluids" refer to fluids removed from the formation and may include pyrolyzation fluid, synthesis gas, mobilized hydrocarbon, and water (steam). Formation fluids may include hydrocarbon fluids as well as non-hydrocarbon fluids. The term "mobilized fluid" refers to fluids in a hydrocarbon containing formation that are able to flow as a result of thermal treatment of the formation.

The term "wellbore" refers to a hole in a formation made by drilling or insertion of a conduit into the formation. A wellbore may have a substantially circular cross section, or another cross-sectional shape. As used herein, the terms "well" and "opening," when referring to an opening in the formation may be used interchangeably with the term "wellbore."

"Orifices" refer to openings (e.g., openings in conduits) having a wide variety of sizes and cross-sectional shapes including, but not limited to, circles, ovals, squares, rectangles, triangles, slits, or other regular or irregular shapes.

"Paraffin hydrocarbons" or "Paraffins" refer to any of the saturated hydrocarbons having the general formula $C_nH_{2n+2}$, C being a carbon atom, H a hydrogen atom, and n an integer greater than 15. Paraffins having more than 15 carbon atoms per molecule are generally solids at or about room temperature and can form solid deposits in wellbores as the produced fluid cools when being conveyed to the surface.

In an embodiment, systems and methods for generating heat in an oil or gas well using electromagnetic heating use a permanent magnet array to induce eddy currents to heat a moving metallic component such as a tubing string or a metallic cylinder. Electromagnetic heating can be used to prevent the deposition of paraffin or remove paraffin in oil wells or for heating up produced or injected fluids such as oil, water or gas.

Induction heating is generally produced by moving permanent magnets with respective to a conductive metal to generate eddy currents in the conductive metal, causing the temperature of the conductive metal to increase. The permanent magnets may be installed in many different ways. Some examples of permanent magnet arrays include:

1. Cylindrical arrangement of alternately placed north-south poles of permanent magnets.
2. A linear array of North-South poles of permanent magnets.
3. A cylindrical or linear Halbach array of magnets There are many methods for moving the metallic component relative to the permanent magnets. Some of these methods include:
1. Rotating a metallic cylinder inside or outside an array of magnets.
2. The linear motion of the metallic component or the magnets relative to each other.

There are many methods for moving the metallic components relative to the permanent magnets. Some of these methods include:
1. Using the motion of a sucker rod pump installed for artificial lift in the well.
2. Utilizing a downhole motor to drive the metallic components or the magnets in the rotary or linear motion.
3. Utilizing fluid pressures to move the magnets or the metallic components relative to each other.
4. Utilizing fluid velocities to move the magnets or metallic components relative to each other.

In one embodiment, an electromagnetic (EM) heater is integrated into a sucker rod assembly connected to a pump jack. The system and method is a modification of existing pumping equipment by adding an EM heat generation unit within the wellbore, but above the existing downhole pump. In this manner, fluids in the well above the downhole pump can be heated to keep the paraffin hydrocarbons in a liquid state or prevent paraffin from depositing in the wellbore tubing by keeping the temperature of the produced fluid above the cloud point of the produced fluid so that the paraffin rises with the produced fluid to the surface.

FIG. 1 depicts a typical hydraulic pump disposed in a casing within a subterranean formation. Subterranean formation 100 includes a hydrocarbon containing section 110 through which a wellbore 120 has been formed. Wellbore 120 includes a cement 122 encased casing 124 which leads into and/or through hydrocarbon containing section 110. A downhole pump system 130 includes tubing string 132 and downhole pump 134 coupled to sucker rod 136. In an embodiment, a down-hole pump has two ball check valves: a stationary valve at bottom called the standing valve, and a valve on the piston connected to the bottom of the sucker rods that travels up and down as the rods reciprocate, known as the traveling valve. Reservoir fluid enters from the formation into the bottom of the borehole through perforations 140 that have been made through the casing and cement.

When the rods at the pump end are traveling up, the traveling valve is closed and the standing valve is open. Consequently, the pump barrel fills with the fluid from the formation as the traveling piston lifts the previous contents of the barrel upwards. When the rods begin pushing down, the traveling valve opens and the standing valve closes. The traveling valve drops through the fluid in the barrel (which had been sucked in during the upstroke). The piston then reaches the end of its stroke and begins its path upwards again, repeating the process.

In an embodiment, existing pumping systems may be modified by using a permanent magnet array to induce eddy currents to heat a moving metallic component such as a tubing string or a metallic cylinder coupled to the tuning string. This could be used to prevent the deposition of paraffin or remove paraffin in oil wells or for heating up produced or injected fluids such as oil, water or gas. It would be advantageous to integrate the EM heater into a sucker rod assembly connected to a pump jack. The method involves modifying the existing pumping equipment (e.g., the typical system depicted in FIG. 1) by adding an EM heat generation unit above the existing pump. In this manner, fluids may be heated in the well above the pump to remove the paraffin or prevent it from forming by keeping the oil temperature above the cloud point of the oil so that is flows with the oil to the surface.

Figure 2:
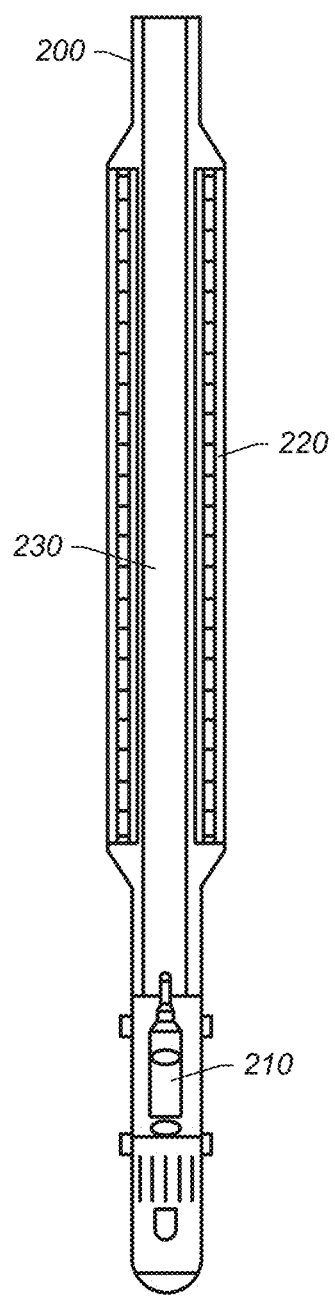
FIG. 2 depicts a schematic drawing of an electromagnetic heater coupled to a tubing string and a down-hole pump.
Figure 3:
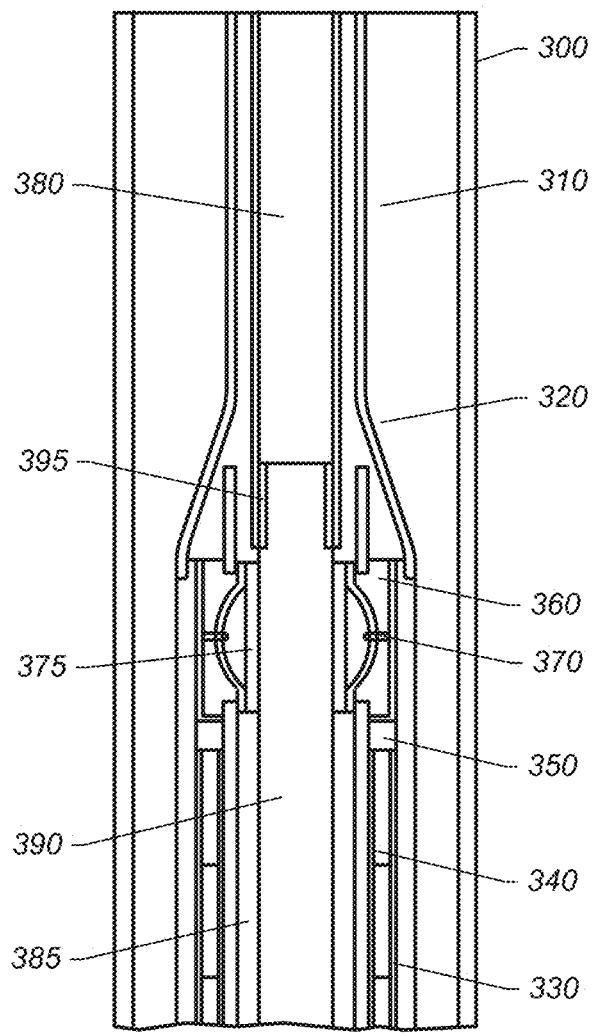
FIG. 3 depicts a detailed cross section of a downhole electromagnetic heater assembly.

A drawing of an EM heater 220 coupled to a tubing string 200 and a down-hole pump 210 (e.g., coupled to sucker rod 230) is depicted in FIG. 2. The EM heater uses a conducting drum that rotates with respect to permanent magnets coupled (e.g., via an epoxy resin) to the surface of the stationary tubing string. FIG. 2A depicts an exploded view of the permanent magnets of the schematic diagram of FIG. 2, with the permanent magnets in a linear arrangement having alternately placed north-south poles. FIG. 2B depicts an exploded view of the permanent magnets of the schematic diagram of FIG. 2, with the permanent magnets in a linear Halbach array. FIG. 3 shows a detailed cross section of a downhole EM heater assembly. The EM heater assembly installs in the well casing 300 like any other tubing joint 310. A coupling connects the larger tubing of the heater to the tubing string of the well 320. Permanent magnets 330 are connected to the inner wall of the heater tubing in a regular or Halbach array pattern. The spinning tube member 340 that will be heated by eddy currents is mounted inside the heater tubing on bearings 350. There is an integrated drive member 360 welded to the spinning tube and equipped with drive pins 370. The sucker rod 380 and pump (not shown) are lowered into the well in normal fashion. The joint of the sucker rod that resides at heater depth is actually a lead screw 390 that couples to the sucker rod with a standard coupling 395. The lead screw is equipped with a nut that has an integrated centralizer 375. As the sucker is lowered through the heater section of tubing the centralizer springs snaps into pocket of the integrated drive member and straddles the drive pins. As the sucker rod moves up and down the nut now trapped in the drive member with the force of the centralizer springs spins and applies force to the rotating tube via the drive pins. As oil flows 385 through the spinning tube it is heated to prevent the formation of paraffin. When it comes time to extract the pump the nut runs to the end of the lead screw and stops. Sufficient force is then applied to the centralizer to collapse the springs into the stationary tubing string and the sucker string and pump are removed from the well.

The time change of the magnetic field within the tubing causes the electromagnetic heating. Typical tubing diameters found in the literature are 2⅜" (6 cm), 2⅞" (7.5 cm), and 3½" (9 cm). It would be advantageous, but not necessary, to select the larger tubing size for the heater section because the heat generation is proportional to surface area.

Several designs may be used to produce electromagnetic heating. In one embodiment, a system from producing electromagnetic heating is based on linear motion of magnets. Alternatively, electromagnetic heating can be produced by rotational motion of magnets. While it was found that the linear motion of the magnets relative to the stationary component generated less heat than a rotational arrangement, wither arrangement can be used.

In a preferred embodiment, a metal component is rotated relative to a ring of permanent magnets to generate heat in the metal component. This embodiment utilizes a mechanical feature that converts the linear motion of the pump to rotary motion. For example, in one embodiment, a ball screw or a lead screw may be used to convert linear motion to rotary motion. With this technique the rotational surface speed of the metallic drum (relative to the magnets) can be increased over that produced by the linear motion of the pump jack. This increase in speed leads to an increase in eddy current heating.

Figure 4:
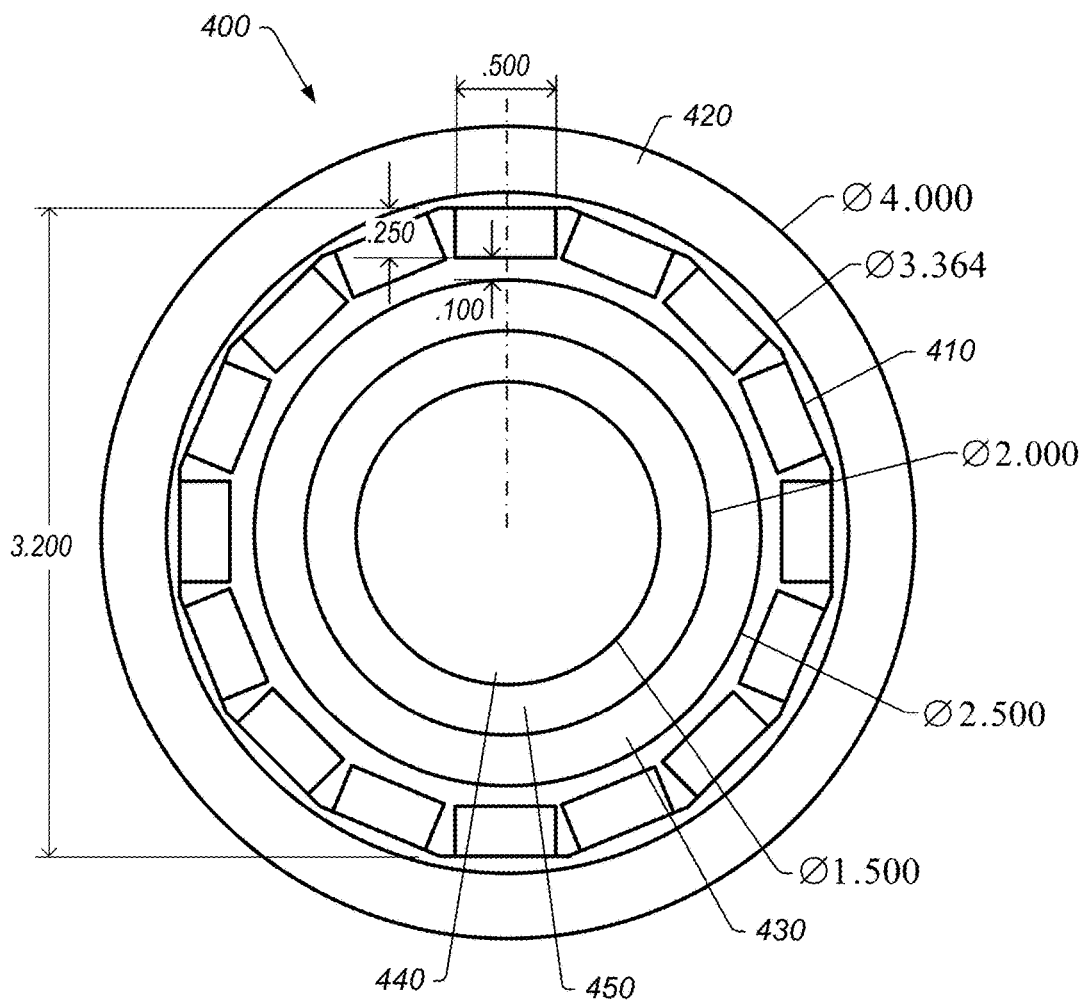
FIG. 4 depicts a cross-sectional top view of the electromagnetic heater section.

In one embodiment, depicted in FIGS. 2-4, the relative motion between the permanent magnets and the metallic component is accomplished by rotating a metallic cylinder within a ring of permanent magnets. This induces eddy currents in the metal component. The linear pumping motion of the pump is converted to rotary motion of the permanent magnet rotor utilizing a simple screw device with an integrated drive. (FIG. 3). The screw is pitched to allow a desired number of revolutions (for example 50 revolutions) of the device on the upstroke of the pump jack. This translates into a rotary motion of up to about 600 rpm.

In an exemplary application of a lead or ball screw, the screw is rotated to provide linear motion of the nut. In this embodiment, the screw, as part of the sucker rod, is driven through the nut and the nut spins a clutch mechanism that will then engage and rotate the drum (See FIG. 3).

FIG. 4 depicts a cross-sectional top view of the electromagnetic heater section 400. In this embodiment, the heater utilizes planar permanent magnets 410 built into a section of well tubing 420. The conducting tube 430 is rotated by a specialized coupling that converts linear motion of the sucker rod 440 to rotary motion of the tube. The rotor with permanent magnets installed in slots rotates inside the casing to introduce eddy currents in the oil 450 in the rotating metal cylinder and provide the thermal heating. Oil flows between the sucker rod and the rotating tube and is heated by the eddy current losses in the tube.

Figure 5:
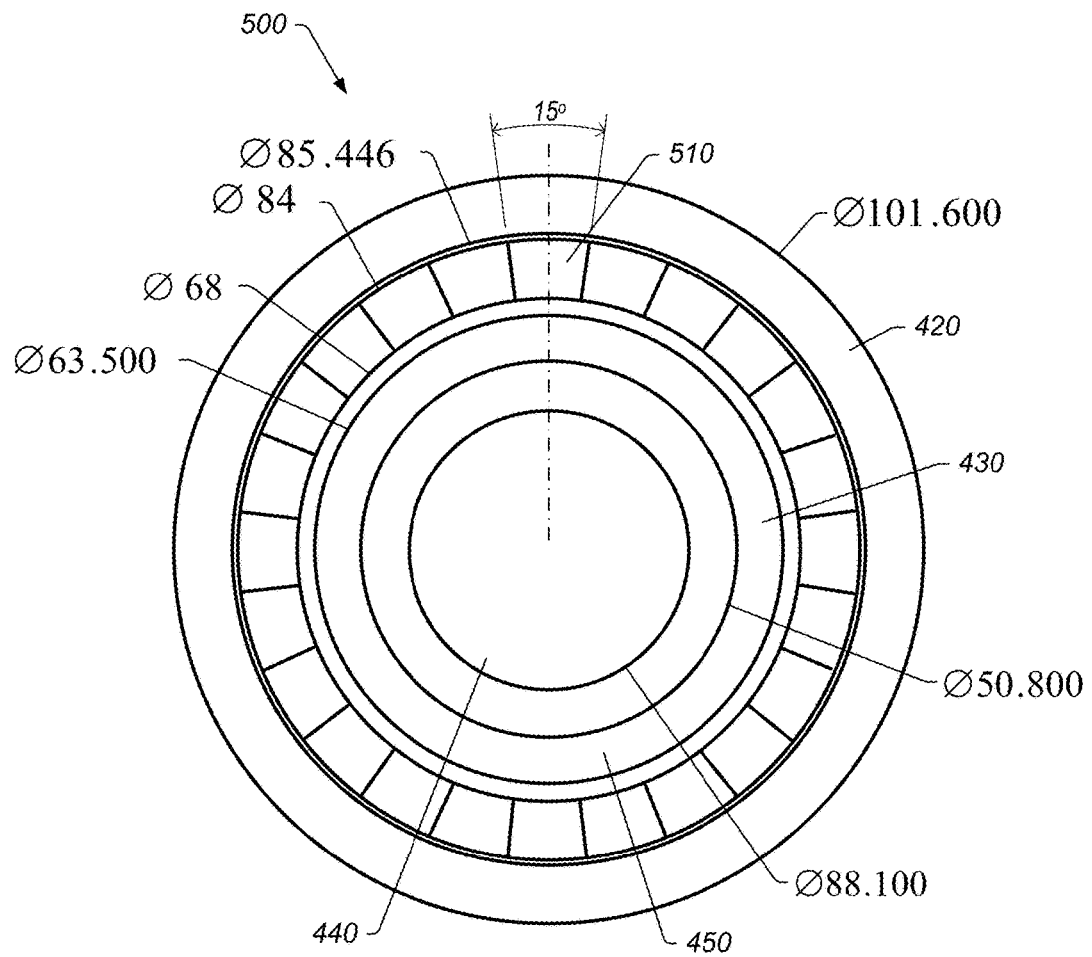
FIG. 5 depicts an alternate embodiment of an electromagnetic heating system.
Figure 5A:
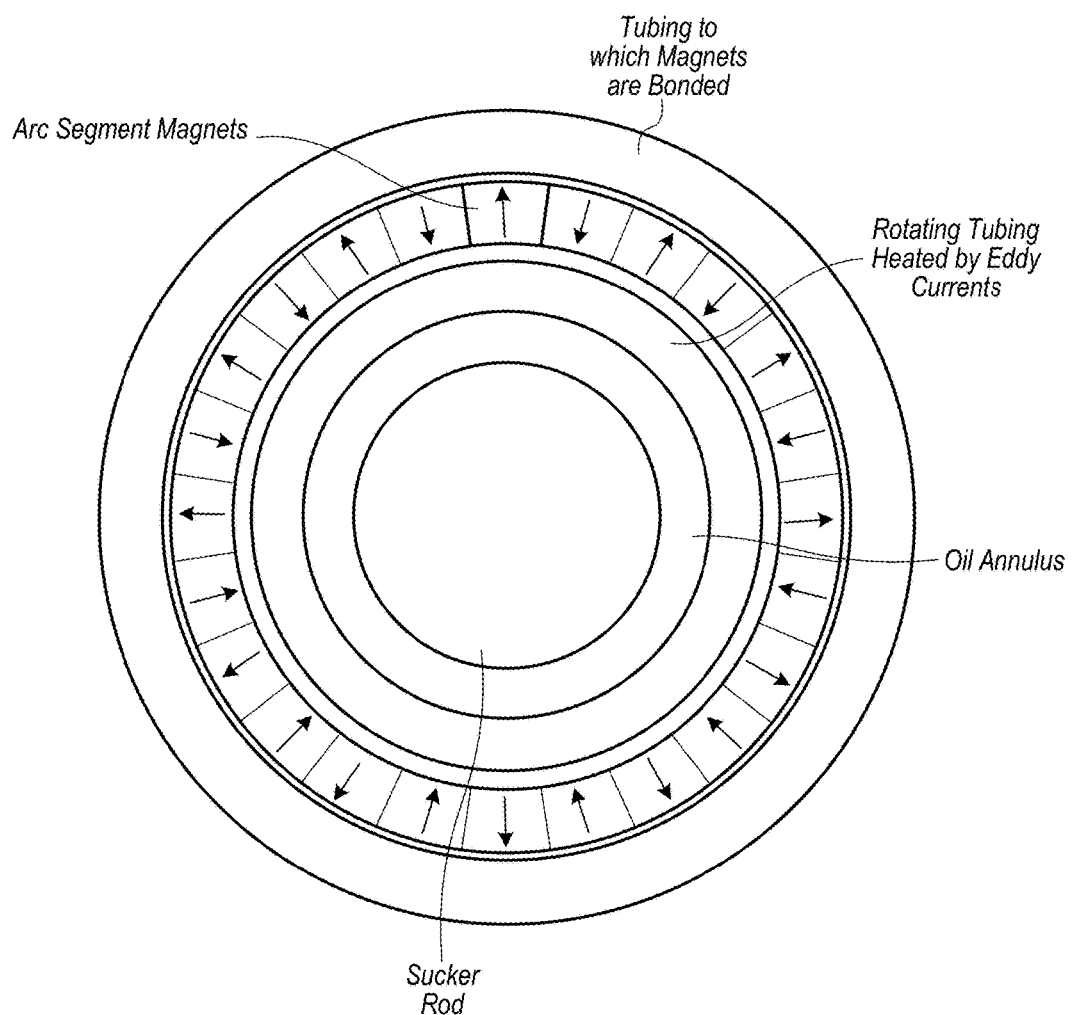
FIG. 5A depicts an schematic diagram of the electromagnetic heating system of FIG. 5 with the permanent magnets placed in a cylindrical arrangement having alternately placed north-south poles.
Figure 5B:
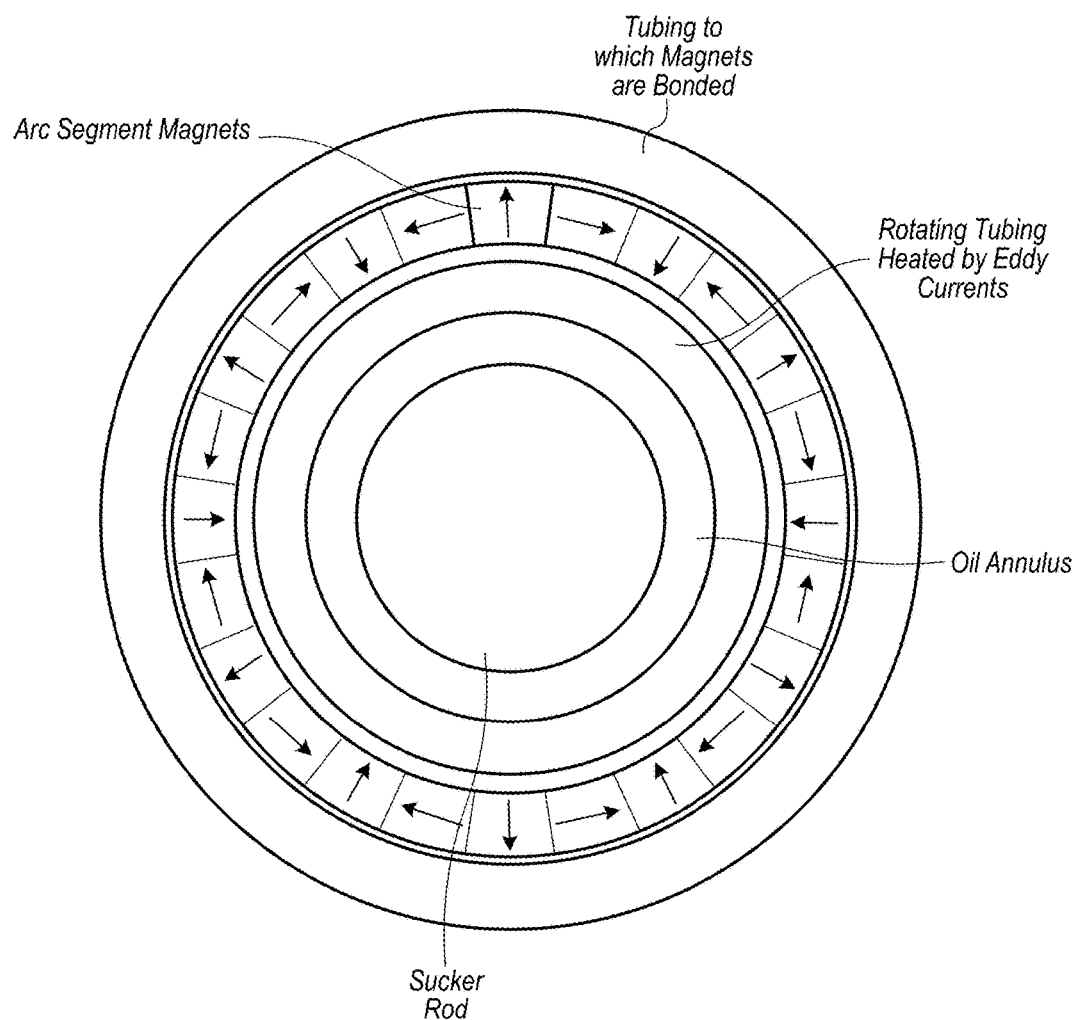
FIG. 5B depicts an schematic diagram of the electromagnetic heating system of FIG. 5 with the permanent magnets placed in a cylindrical arrangement in a linear Halbach array.

An alternate embodiment of an electromagnetic heating system 500 is depicted in FIG. 5. In this embodiment, the magnets are curved 510 to concentrate the magnetic field. The concentration in flux in the rotating conductor produces increased power loss and heating with respect to the planar magnet design depicted in FIG. 4. In one embodiment, shown in FIG. 5A, the permanent magnets may be placed in a cylindrical arrangement having alternately placed north-south poles. In an alternate embodiment, shown in FIG. 5B, the permanent magnets may be placed in a cylindrical arrangement in a linear Halbach array.

The expected heat generation is now increased to 10.4 kW per meter. In addition the circumferential and radial magnetic fields do not interfere as much lowering the possibility of demagnetization. This design increases the number of poles, raising the operating frequency and therefore the eddy current generation. The ability to produce more peak power is important because the sinusoidal motion of the pump lowers the average power of the device. The ability to produce 13.4 kW of average power in a 100 inch stroke demonstrates, however, that the device can inhibit paraffin formation.

Figure 6:
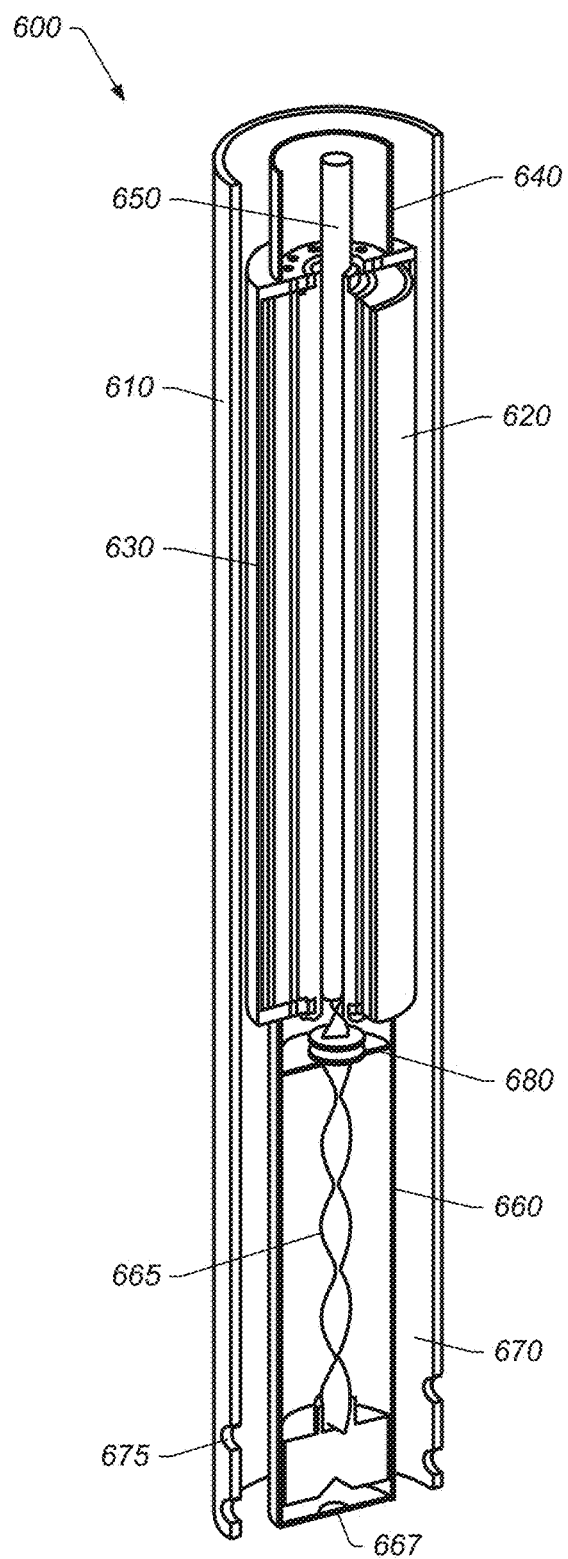
FIG. 6 depicts an embodiment of an electromagnetic heating system configured to heat the casing of a wellbore.

There are other oilfield applications where an electromagnetic heater may be advantageously employed. An example of two such applications would be heavy oil recovery and hydrate plug removal in gas wells. For these applications there may be an advantage to heat the casing. FIG. 6 depicts an embodiment 600, which may be used to heat the casing 610. In this embodiment, the magnets 620 in a housing 630 rotate in a composite extension of the well tubing 640 around the sucker rod 650 to create an electric field in the casing Housing 630 may be coupled (via rotary clutch 680) to pump section 660 within traveling valve 670 (e.g., including openings 675). Pump section 660 may include spiral drive 665 and standing valve 667.

The proposed downhole induction heating method has the following key advantages.

1. The heat is delivered locally and at a depth that can be selected by the user. This implies that it is not necessary to heat the entire wellbore as is usually the case with heaters placed on the surface. This can result in significant energy savings.
2. The embodiments of this system do not necessarily require any electrical connections to be provided downhole. This can result in significant capital savings for both installation and maintenance.
3. Some embodiments of this method can be integrated into the existing wellbore architecture i.e. connected to the tubing or pump directly. This implies that the method can be used for existing wells very minor changes to the existing hardware.
4. The proposed method can be used in conjunction with existing pumping equipment such as sucker rod pumps and electrical submersible pumps.
5. If the downhole heater is used to heat water for injection into the reservoir, placing the induction heaters close to the bottom of the well provides us with the following advantages:
   a. No electrical cables need to be lowered into the well (as would be the case with downhole electrical heaters.
   b. The risk of hot-spots and localized overheating is minimized.
   c. The heat loss from the well to the surrounding rock as the hot fluid travels from the surface to the bottom of the well is eliminated or substantially reduced. This eliminates the need for wellbore thermal insulation. It implies that steam injection can be pratically applied to deeper formations (which otherwise is not attempted due to wellbore heat losses).
   d. Only the bottom of the well is subjected to the high temperature and this drastically reduces corrosion rates and prevents other high temperature reactions from occurring in the well. The use of corrosion inhibitors is reduced and damage to the wellbore steel is also reduced significantly.
   e. Less expensive steel can be used to construct most of the well. Only the portion of the well where the heater is located needs to be constructed of metals that can withstand high temperatures for extended periods of time.

To show that the electromagentic heaters described herein can be used to remove paraffin from wells, the system was modeled and the model used to determine the heat generated. It is assumed that the downhole induction heater is being driven by a sucker rod pump. As stated elsewhere in this patent application this is one of many embodiments of the proposed method. To estimate the amount of heat needed to remove paraffin from oil wells the following assumptions were made.

The pump jack makes 6 strokes/min (this is an up and a down)
The stroke length is 200" (the screw length would be 100")
1200"/min
100'/min
1.67'/sec
0.51 m/sec
Heat capacity of water:

$$C_p = 4.18 \frac{kJ}{kg\ °K}$$

Heat capacity of oil:

$$C_p = 2.09 \frac{kJ}{kg\ °K}$$

Assume desired flow is:

$$50 \frac{bbl}{day}\ of\ water\ \ 50 \frac{bbl}{day}\ of\ oil$$

Power required to raise water 25 C:

$$P = \frac{50\ bbl}{day} \frac{159}{bbl} \frac{1\ kg}{1} \frac{day}{86,400\ s} \frac{4.18\ kJ}{kgK} 25K = 9.61\ kW$$

Power required to raise oil 25 C:

$$P = \frac{50\ bbl}{day} \frac{159}{bbl} \frac{0.8\ kg}{1} \frac{day}{86,400\ s} \frac{2.09\ kJ}{kgK} 25K = 3.8\ kW$$

Approximate total power requirement is 13.4 kW.

Based on the design presented in this patent this would require a magnetic array that is approximately 1 to 2 m long (depending on the diameter of the well).

It is understood that the formation fluid will change well to well and the calculation above is only an example. Similarly the design parameters for the heater allow the device to be tuned to the given well requirements. For example if the cooling effect of subsurface water is causing paraffin formation at multiple locations more than one device can be place in the well at desired depths to increase the temperature of the fluid. If the mixture of fluid constituents and pumping rate require a different input power then the length of the rotary heating tube can be adjusted to produce the required power. Additionally the lead of the screw can be changed to adjust the rotary speed of the device and because induction heat is proportional to the rotary speed squared the power is easily tuned. If the reservoir is of particularly high temperature the magnet type can be changed with an associated reduction in magnetic field but the power delivery can be maintained by adjusting the speed of the device or the length of the rotary member. These are just a few examples of the design parameters that can be adjusted to achieve formation fluid recovery under specified conditions.

A similar calculation can be done for injection wells where hot-water or steam injection into the reservoir is desired. For example if 100 bbl of water per day needs to be injected into the well and the temperature needs to be increased by 125 C at the bottom of the well, the heat needed would be approximately 120 kW. Based on the design presented herein this would require a heater that is approximately 5 to 10 m long (depending on the diameter of the well).

While the above description has focused on the use of electromagnetic heating for downhole heating applications, it should be understood that the same devices can be used for surface heating applications. In one embodiment, the devices described herein may be modified for use on surface flow lines as well as surface and near surface production lines. Surface, and near surface, electromagnetic heating systems can be used, for example, to prevent paraffin deposition in surface flow lines.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Figure 7:
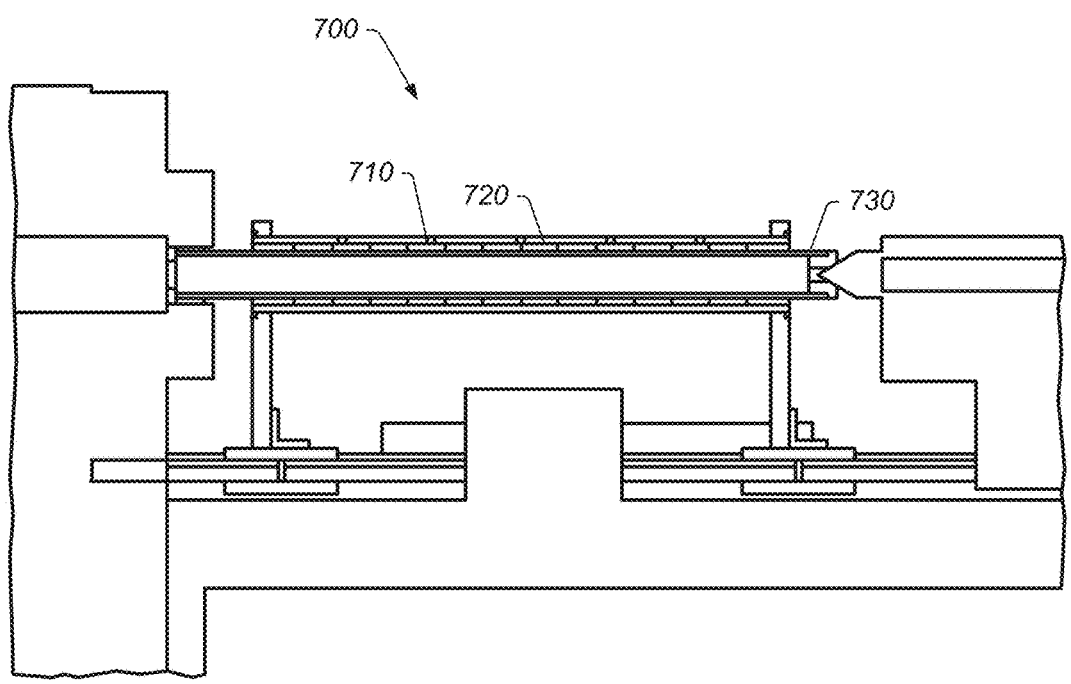
FIG. 7 shows a schematic diagram of a prototype device.

A prototype device was built and measurements made on this prototype device are presented and shown to agree well with the simulation results. FIG. 7 shows a schematic of the prototype device 700. In this experiment the torque tube 710 to which the magnets 720 are mounted is free to rotate on low loss bearings. The conducting tube 730 is spun by the lathe and eddy currents are induced in the tube. The lathe is turned at constant speed and by measuring the torque on the torque tube the power generated by eddy currents can be calculated.

Figure 8:
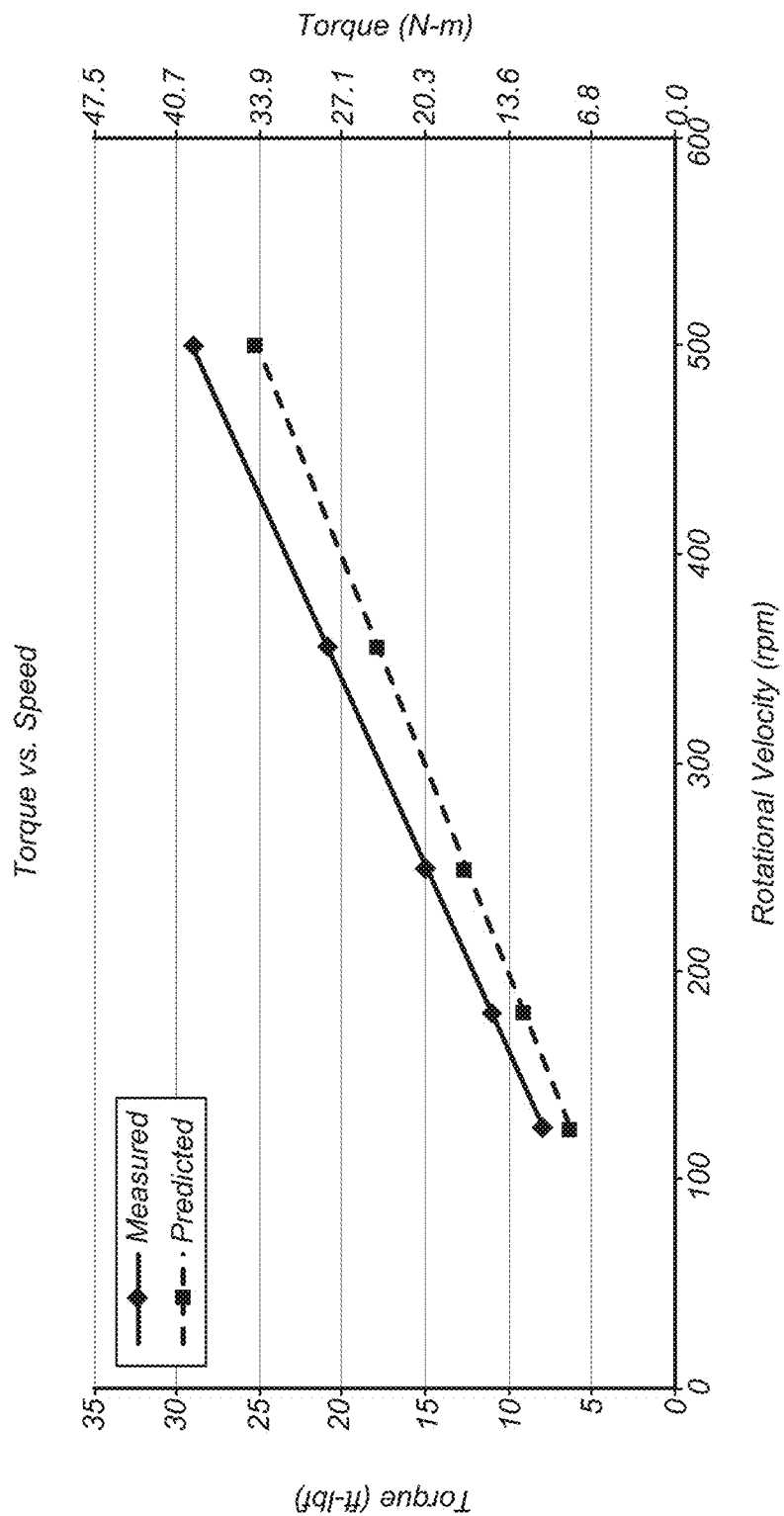
FIG. 8 depicts a graphical comparison of generated by the spinning motion of the prototype device of FIG. 7 compared with the computed torque.

Tests were conducted on the device by spinning it in a lathe at different rotational speeds and measuring the temperature of the assembly after different times of rotation. The torque generated by the spinning motion was also measured and compared with the computed torque, FIG. 8. This is a more direct measure of the electromagnetic work being done and converted to heat in the metal component. The experimental results overpredict the model results because a higher conductivity material was used in the experiment for the spinning tube.

Figure 9:
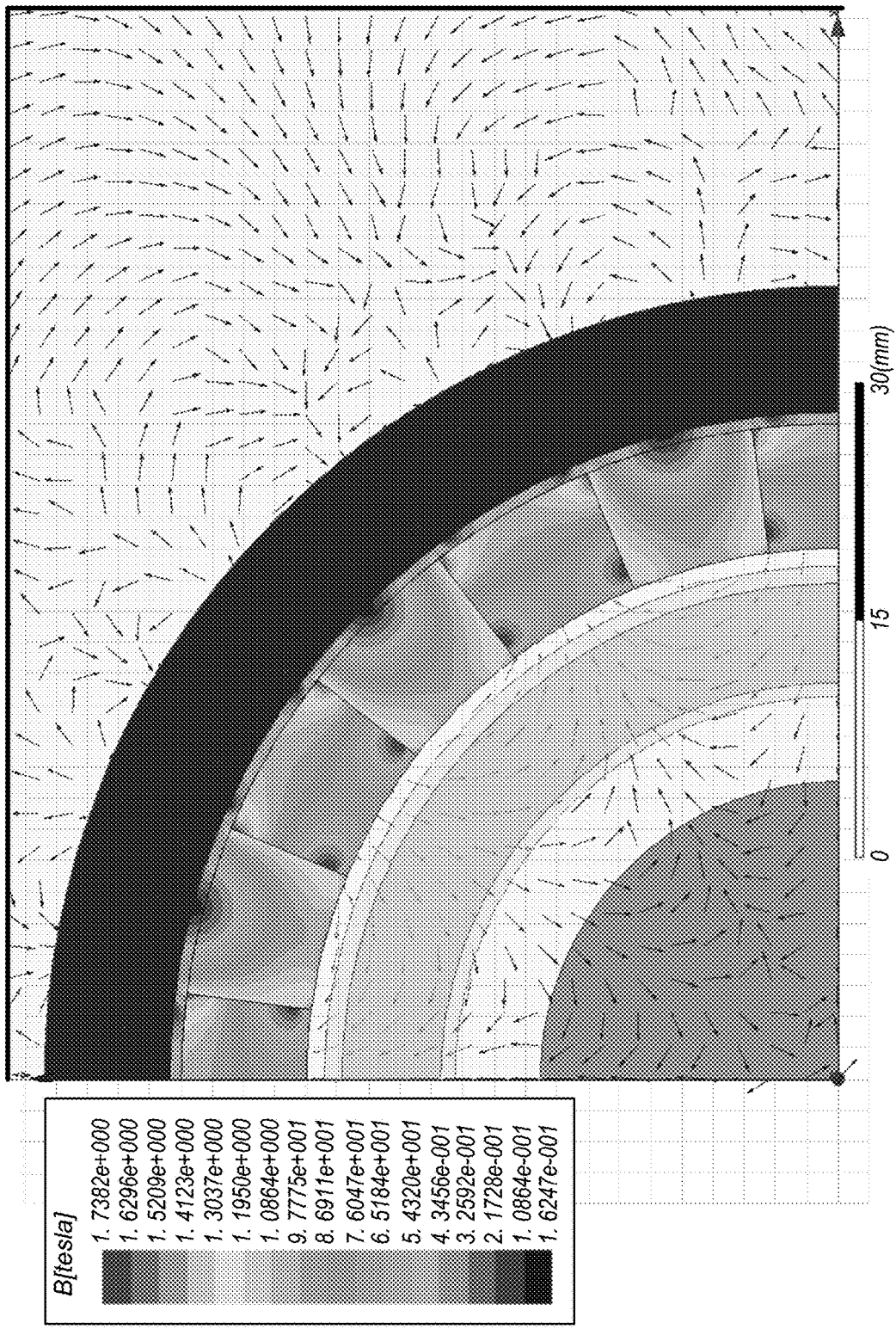
FIG. 9 depicts the magnetic flux generated in the device.

To estimate the heat generated by the proposed induction heater, simulation models were built to compute the extent of heating that may be expected with different configurations of permanent magnets and metal components moving relative to the magnets. An electromagnetic simulator was used to numerically simulate the heat generated by the preferred embodiment. The results of this simulation are depicted in FIG. 9. In addition to the electromechanical modeling, a thermal model was built to estimate the temperature increase caused by the induction heater. Both these models were run for different configuration of magnets and the moving metallic component as well as fluid velocities in the annulus.

Figure 10:
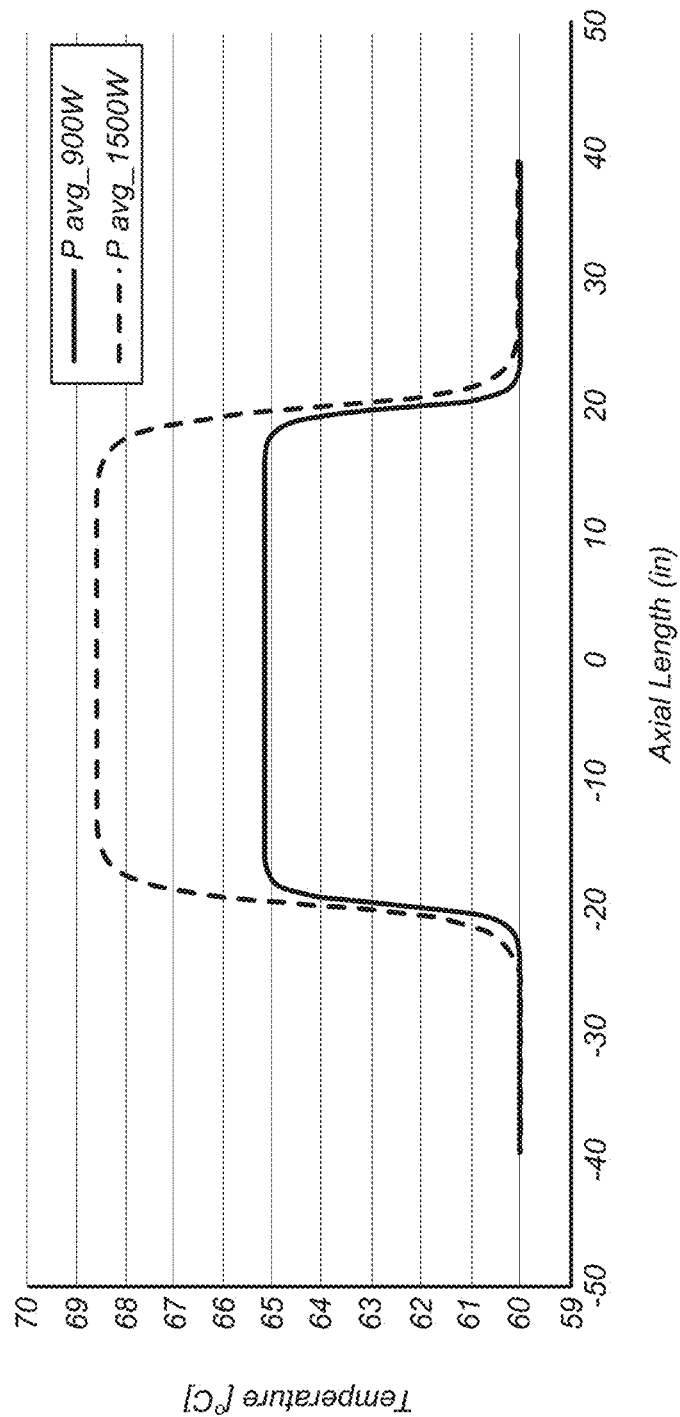
FIG. 10 depicts the results of a simulation of induction heating in a well bore.

Of importance is the ability of the spinning heated tube to heat the oil. Under steady state conditions the rise in temperature of the surface of the heater tube with a mixture of 50 bbl/day of oil and 50 bbl/day of brine flowing over the tube surface is shown in FIG. 10. The heater may be placed in the tubing string at different locations to boost the temperature of the pumped fluid to keep it above the cloud point of paraffin.

In some embodiments, as previously discussed a metal component is rotated relative to a ring of permanent magnets to generate heat in the metal component. This embodiment utilizes a mechanical feature that converts the linear motion of the pump to rotary motion. The heating system has a housing that integrates with the tubing string in a well with artificial lift. The heating system may integrate with the sucker rod by the installation of a lead screw and anti-torque member in the sucker rod string.

Figure 11:
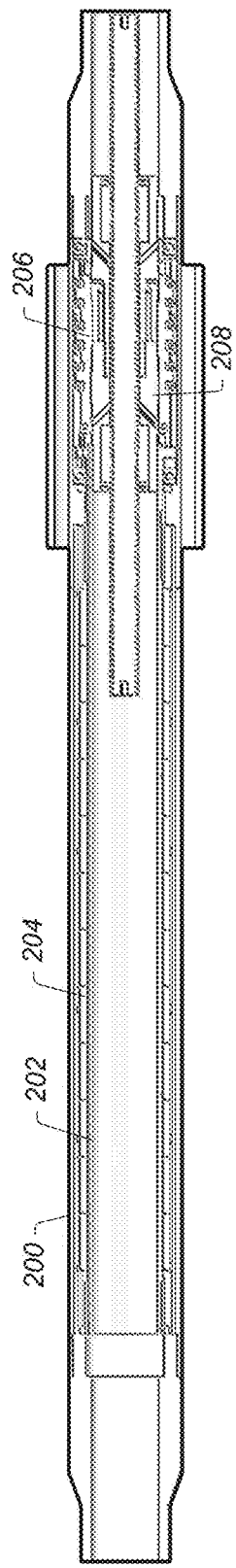
FIG. 11 depicts an embodiment of a drive coupler.

FIG. 11 depicts a heating system described herein including the drive coupler. In some embodiments, the housing of the heating system which contains the armature and stator of the induction heating device may engage the lead screw to convert axial to rotary motion with a coupler 200. The function of the coupler is to allow the nut on the lead screw to engage the axially fixed rotating member in the tubing string, the armature 202. The armature is the rotary member that spins inside magnets fixed to the tubing string, the stator 204.

Figure 12:
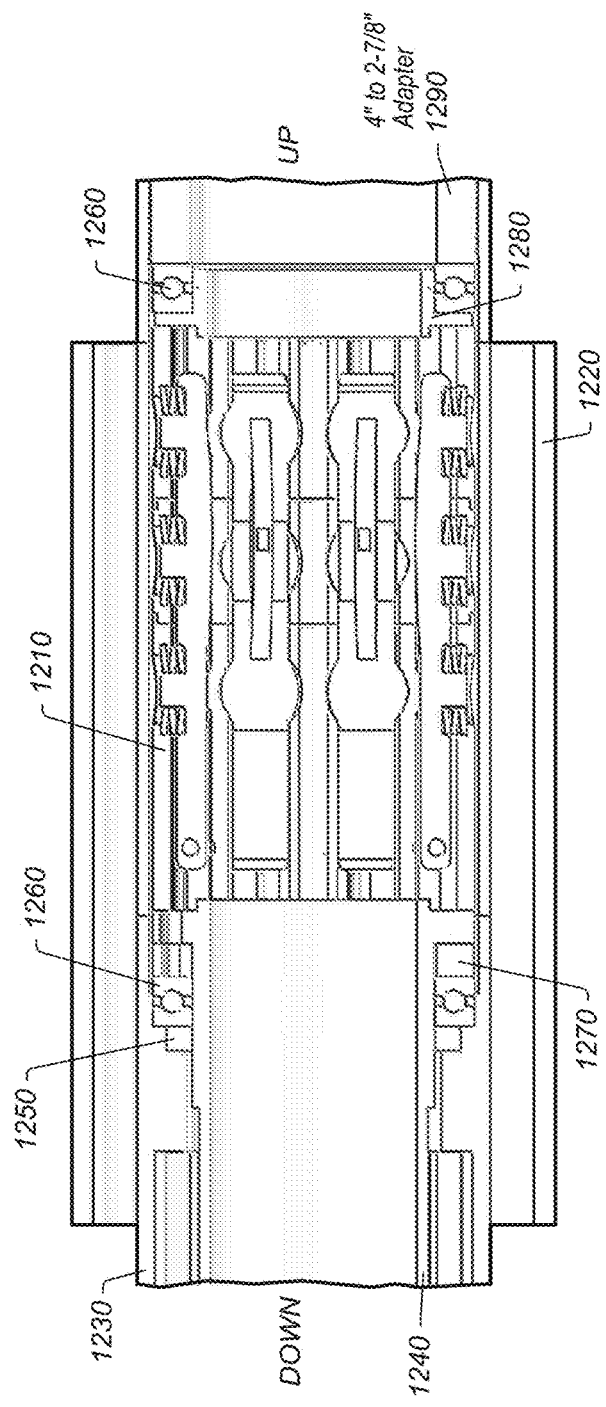
FIG. 12 depicts an embodiment of heater coupling interfaces.

Through induction the tube heats and in turn heats oil flowing through the spinning tube and prevents the oil temperature from dropping below the cloud point of paraffin. The mechanism of the coupler selected for this duty is a set of spring loaded levers 206. Because the lift pump has to be inserted and removed from the well with the sucker rod the inner diameter described by the levers has to allow passage of the pump without damage. On the other hand the nut on the lead screw that provides the rotary drive has to engage the levers and stay engaged to allow the lead screw to convert linear to rotary motion at the desired power level 208. FIG. 12 depicts an embodiment of a heater coupling interface from FIG. 11 in more detail. In FIG. 12 the heater coupling 1210 is depicted in a well casing 1220. Although specific casing and pipe sizing are depicted for illustration this should not be seen as limiting and the heater system scaling may be reduced or increased as needed. Piping 1230 and aluminum heater tube 1240 are coupled to heater coupling interface using radial bearings 1250, thrust bearings 1260, nut plate 1270, and/or spacer 1280. In some embodiments, an adapter 1290 (e.g., 4" to 2⅞") may be used to couple piping 1230.

Figure 13:
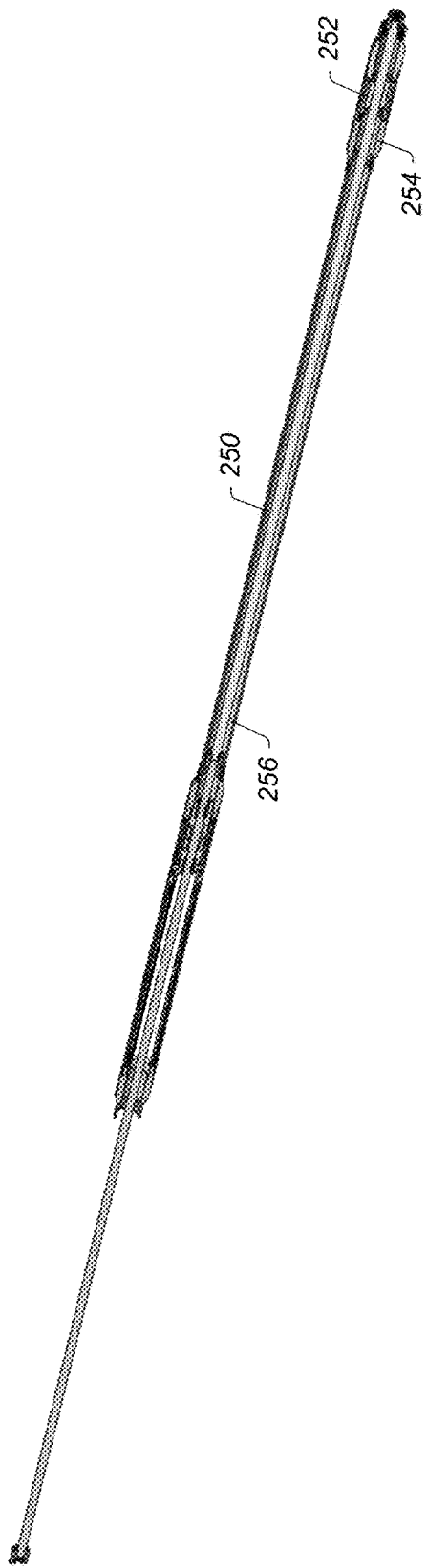
FIG. 13 depicts an embodiment of a torque reaction coupler.

FIG. 13 depicts an embodiment of a torque reaction coupler which functions to counteract applied torque such that any torque applied to the lead screw is then reacted by the upper coupling and transferred to the tubing string thereby closing the load transfer path back to the tubing supporting the heater stator.

The nut is therefore a slightly large diameter than the pump body. The axial profile of the nut is chosen such that one feature spreads the levers requiring an insertion force greater than operating force and a second feature engages with the levers to apply torque to the rotary motion. The insertion force requirement is greater than the operating force requirement thereby keeping the coupling engaged during operation. When it is time to remove the pump a force greater than the operating force is applied to release the coupler engagement. FIGS. 14-20 depict an embodiment of a lever spring coupler during use at various stages of interacting with the nut (i.e., the engager). Once the nut 1400 engages the levers 1410, as the lead screw 1420 moves axially the nut (e.g., threaded nut) rotates around the lead screw. The rotary motion of the lead screw transfers to the nut which when engaged to the levers is in turn transferred to the armature thereby converting axial motion of the lead screw to the rotational movement of the armature.

The embodiment depicted in FIGS. 14-20 depict a lever spring based coupling using a bidirectional nut. As the sucker rod ("elongated member") is lowered into the well the heater tool coupling engages a specially profiled nut on the lead screw which is part of the sucker rod string and transmits the force required to heat the oil without disengaging from the coupling. The embodiment depicted includes lever arms 1410 (e.g., 2-6 lever arms) including a pivot point 1430. Resilient members 1440 may be used to apply a force ("$F_S$") such that the lever arm engages and holds the nut as the nut passes by the lever arm. A raised portion of the lever arm may engage a complementary shaped depression in the nut. The force required to overcome the force "$F_S$" such that the lever is depressed by the nut may be adjusted by replacing and/or adjusting the resilient members (e.g., springs may be replaced by more resilient springs). The coupler is designed with a specific force level for operation and a second higher force level for engagement and disengagement.

Figure 18:
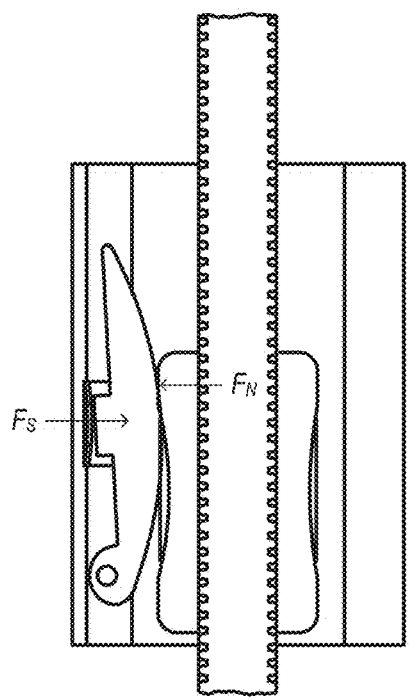
Figure 19:
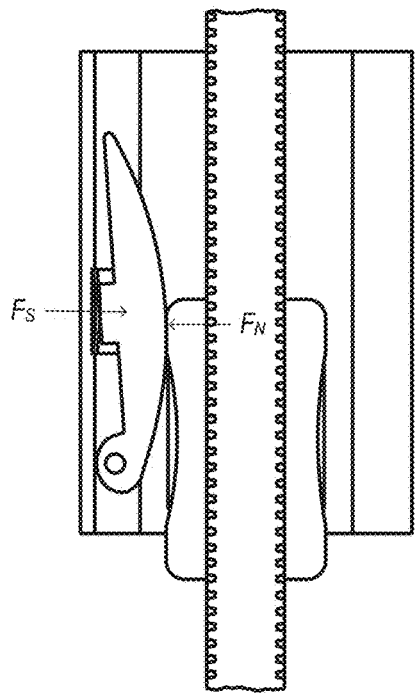
Figure 20:
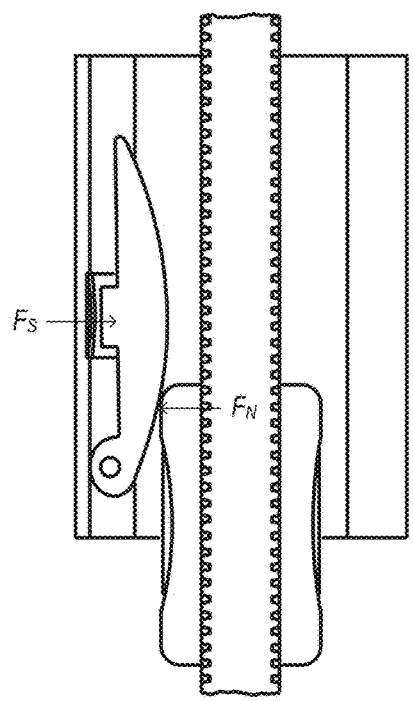

FIG. 15 depicts pre-engagement of nut and lever and the forces involved $F_N=F_S=0$. FIG. 16 depicts the nut engaging the lever and the forces involved $F_N=F_S$ where $F_F=\mu F_N$ (e.g., 1 ea-½" ID×1" OD×0.1" tk, Belleville—$F_S=3000$ lb for brass on SS, $\mu=0.2$ (lubricated), $F_F=600$ lb/spring lever such that Insertion force total=3600 lb). FIG. 17 depicts the nut fully engaging the lever and the forces involved $F_N=F_S=0$ (e.g., the coupler is based on an array of spring loaded levers that engage a specially shaped drive unit). FIGS. 18-19 depict the nut unengaging from the lever and the forces involved $F_N<F_S$ (e.g., the force requirement changes with power level which changes with paraffin heating requirement and the coupler may be modified with replaceable springs to provide the required force levels). FIG. 20 depicts the nut fully unengaging the lever and the forces involved, $F_N=F_S=0$, once unengaged. The embodiment depicted is a bidirectional nut which engages the lever during both the up and the down stroke of the sucker rod. In some embodiments, a unidirectional nut may be used which only substantively engages the lever(s) when on the up or down stroke (depending on the design of the nut and/or lever) of the sucker rod (e.g., by narrowing a diameter of a first or second end of the nut).

Figure 21:
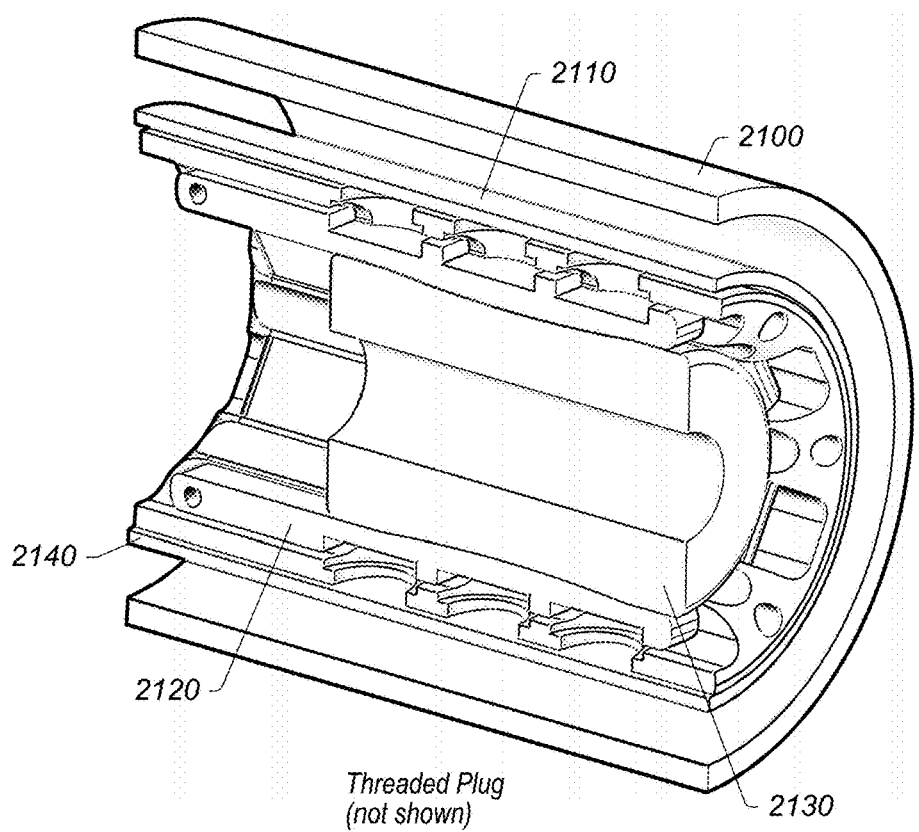
FIG. 21 depicts an embodiment of a bi-directional coupling.
Figure 26B:
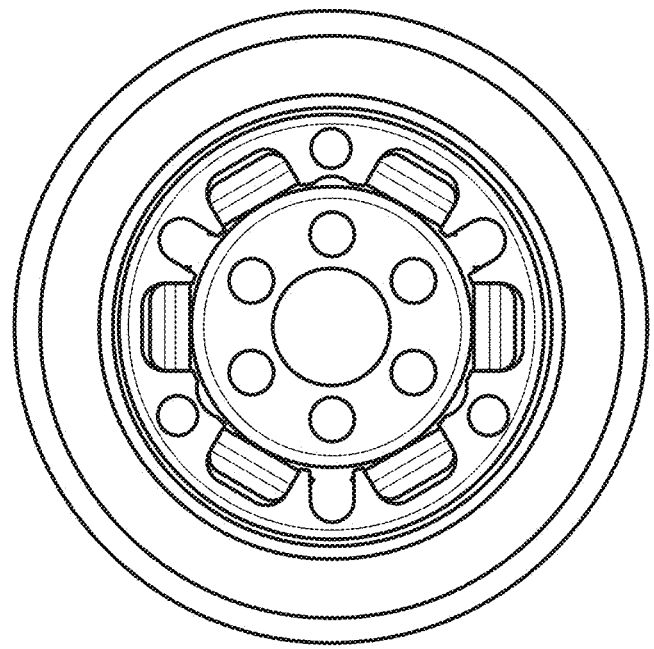
FIGS. 26A-B depict embodiments of a cross-sectional view of a heater coupling of a bidirectional spool.
Figure 26A:
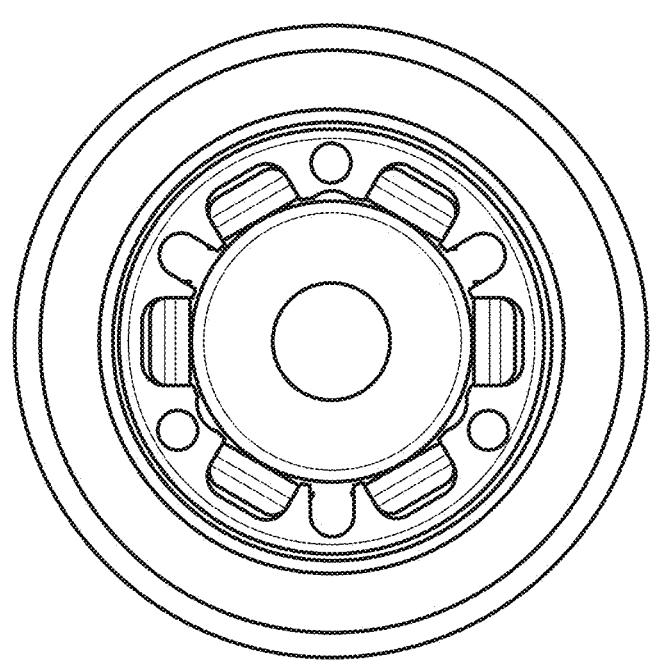

In some embodiments, the sucker rod is preferred to not go into compression; therefore two styles of coupler are useful. FIG. 21 depicts an embodiment of a bi-directional coupling. In some embodiments, a bi-directional coupler may engage the lead screw in either direction of pumping. A bi-directional coupler may engage the lead screw in either direction of pumping if the well is deep enough to have sufficient sucker rod weight below the coupler to provide the drive force. In some embodiments, the well casing 2100 is ⌀5.5" OD, ⌀5.0" ID, the coupling casing 2110 is ⌀4.00" OD, ⌀3.75" ID, the coupling 2140 is ⌀3.65" OD, the inside clearance between levers 2120 is ⌀2.3", the lever radial displacement is 1/16", the spool 2130 OD is ⌀2.425", and the thin wall tubing is ⌀2⅞" to ⌀2.441" ID. FIGS. 26A-B depict embodiments of a cross-sectional view of a heater coupling of a bidirectional spool. In some embodiments, the coupler is designed with flow passages of sufficient area not to interfere with the production flow requirements. For example, 6 opening (e.g., ⌀⅜") may be formed in the bi-directional spool in order to increase fluid flow through the spool. In the embodiment with 6 openings of ⌀⅜" total flow area increased from ~1.7 in^2 to ~2.4 in^2 (relative to 2.4 vs 3.9 in^2 for area of ⌀2⅞" pipe w/⌀1" sucker). Oil passing through the heater accumulates heat from the loss in the induction member and the inefficiency of the screw action on the thread.

Figure 22:
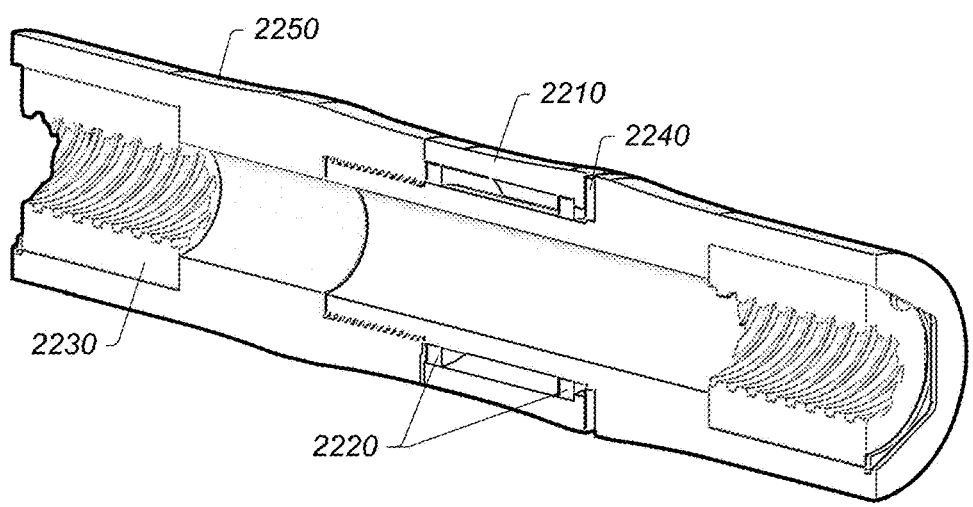
FIG. 22 depicts an embodiment of a unidirectional spool.
Figure 23:
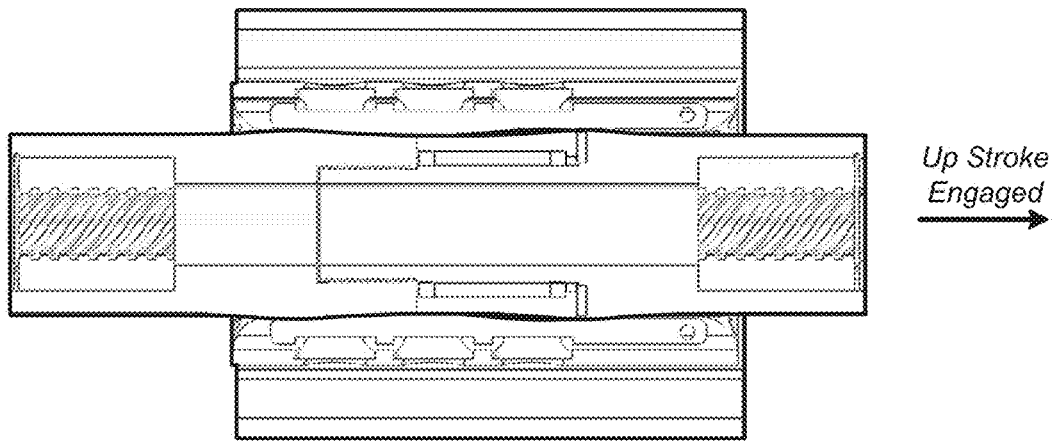
FIG. 23 depicts an embodiment of a unidirectional coupling engaged during an up stroke.
Figure 24:
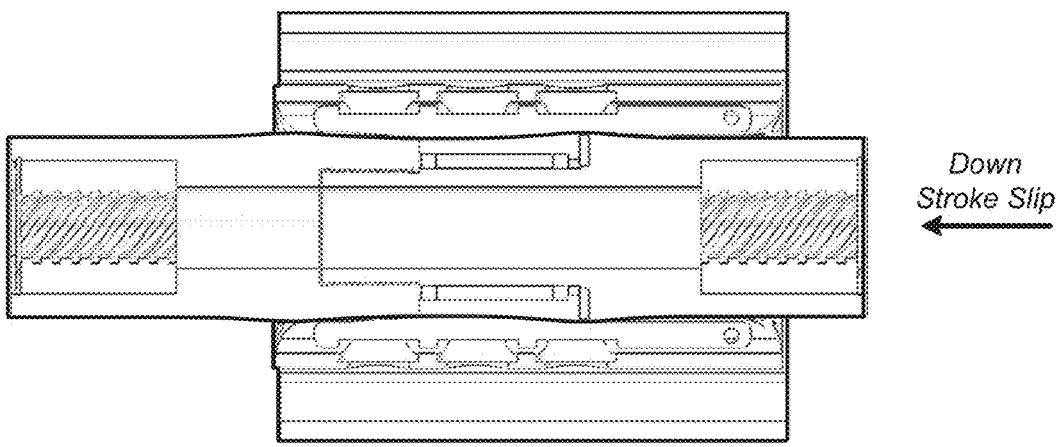
FIG. 24 depicts an embodiment of a unidirectional coupling unengaged during a down stroke.

In some embodiments, a second style of coupler may include a unidirectional spool. The second style of coupler is unidirectional and only engages the lead screw when the pump is moving in one particular direction. A unidirectional coupler may only engage the lead screw when the pump is on upward stroke. FIG. 22 depicts an embodiment of a unidirectional spool 2200 depicted with a slip ring 2210, angular contact bearing 2220, torqspline plastic nut 2230, thrust bearing 2240, and engagement surface 2250. FIG. 23 depicts an embodiment of a unidirectional coupling moving in a well casing on an up stroke with the coupling engaged. FIG. 24 depicts an embodiment of a unidirectional coupling in a well casing on a down stroke with the coupling unengaged due to the slip ring.

Figure 25:
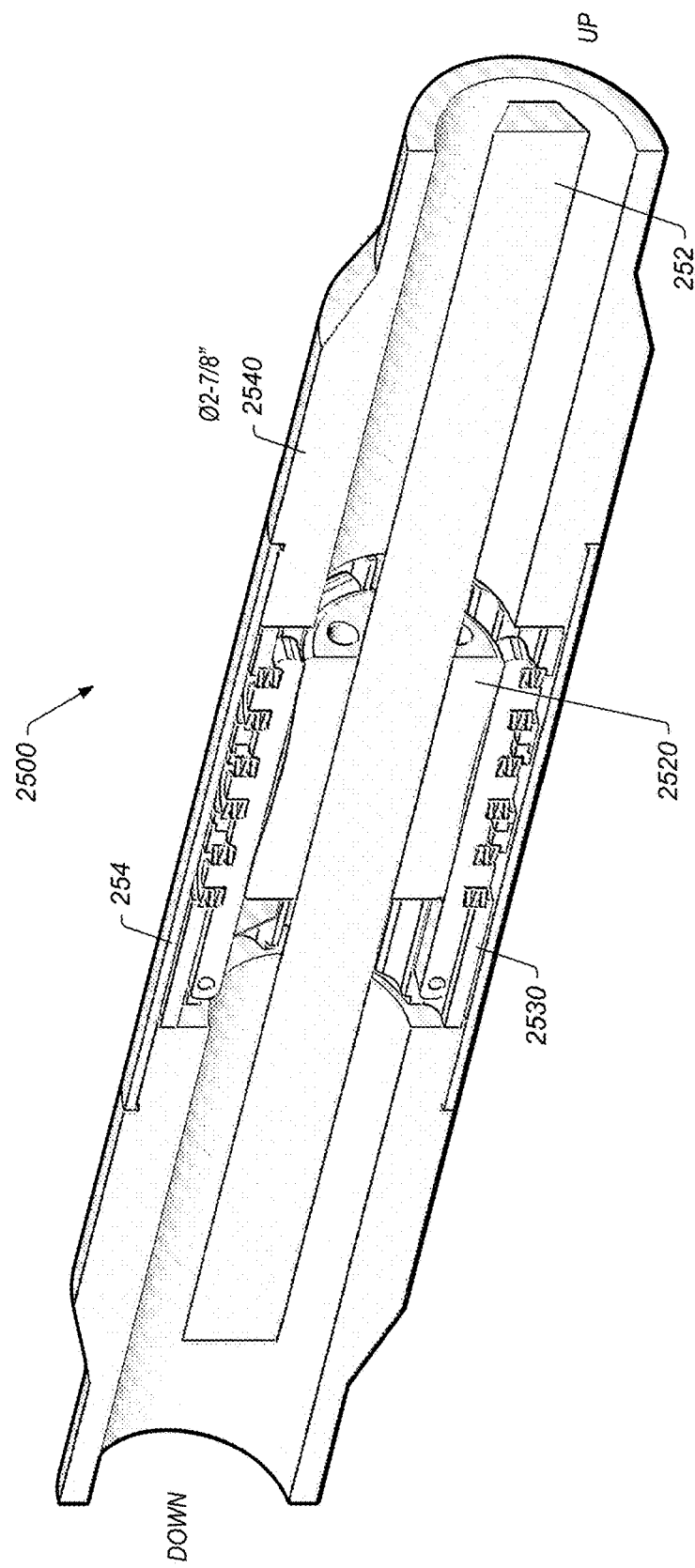
FIG. 25 depicts an embodiment of a torque coupling.

As the lead screw applies force to the specially profiled nut to drive the armature in the stator a reaction torque may be applied to the lead screw. FIGS. 13 and 25 depicts an embodiment of a torque coupling 2500. In line with the lead screw may be an anti-torque rod 252. The anti-torque rod may be prismatic in cross section (e.g., square, hexagonal, etc.). The anti-torque rod may be of a length equivalent to the stroke of the lift pump 250. An inner coupling member 2520, very similar to the nut that is installed on the lead screw, is designed with a slip fit over the prismatic bar 252. The anti-torque coupling 2530 (e.g., identical to heater coupling except for bellvilles springs) uses the same engagement profile as the drive nut. One stroke length above the lead screw coupler a second coupler, non-rotating, is fixed inside the tubing string 254 (e.g., adapters 2540 may be used to couple the tubing string 254 to the piping). At installation as the lead screw nut engages the drive coupler the sliding member on the prismatic bar engages the upper coupling levers. Both the anti-torque coupling and the drive coupling may engage at the same time. The drive coupling and the anti-torque coupling may disengage at the same time. Any torque applied to the lead screw is then reacted by the upper coupling and transferred to the tubing string thereby closing the load transfer path back to the tubing supporting the heater stator. The anti-torque coupling may use the same outer coupling housing as the drive coupling but may require less spring force because it does not transfer axial load. The heater assembly materials may be compatible with the well environment. The heater assembly may have a design life consistent with the well maintenance intervals.

Figure 27:
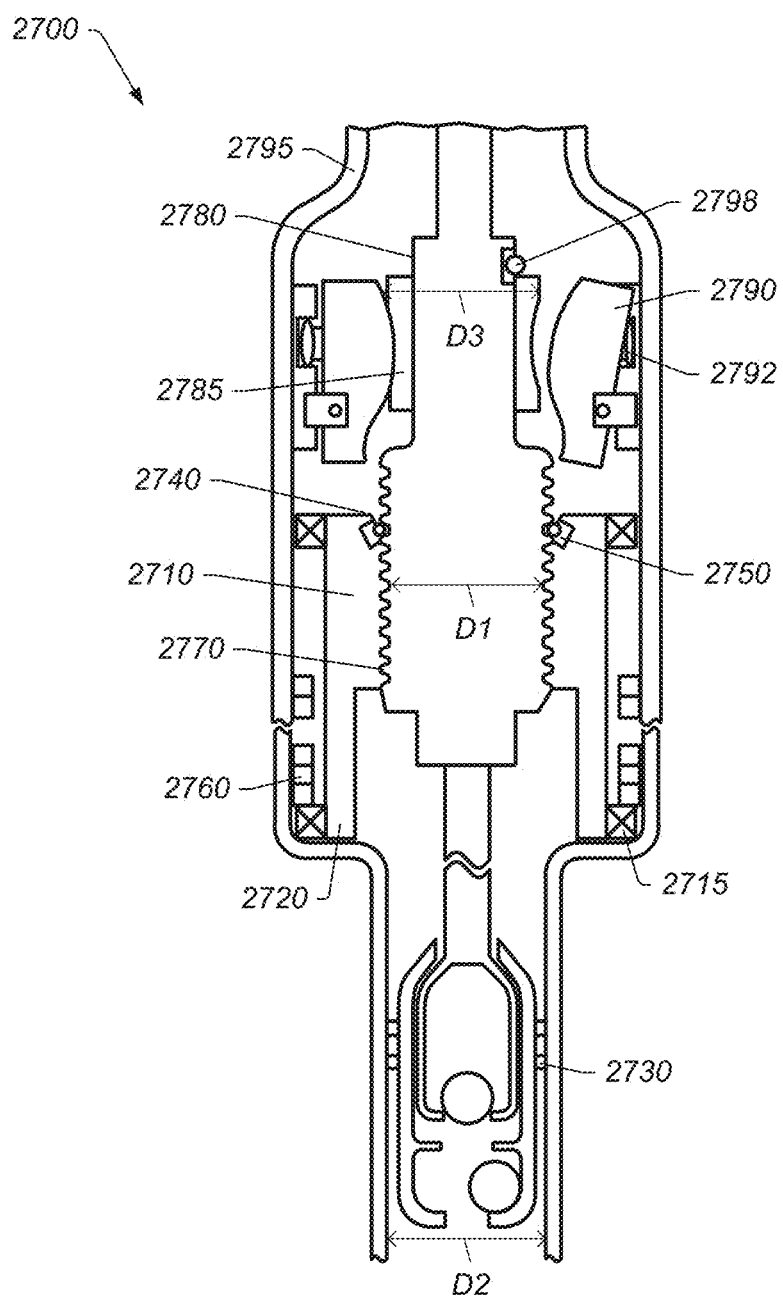
FIG. 27 depicts an alternative embodiment of a cross-sectional view of a of a drive coupler.

FIG. 27 depicts an alternative embodiment of a cross-sectional view of a of a drive coupler 2700. FIG. 27 depicts an alternate method for coupling the paraffin heater tool into the tubing and rod string of an artificial lift system. In this concept the nut 2710 that rotates the heater tube 2720 is fixed in the bore on bearings 2715 (e.g., sealed bearings) and is integrated with the rotating inductively heated shell that heats the oil.

In the previous embodiment described herein the nut was on the lead screw and part of the rod string. The minor diameter of the nut thread is selected such that the seating cups 2730 on the pump can pass through without being damaged. The engager or nut is fashioned such that the lead screw portion of the rod string can self-start in the nut. One embodiment of this device uses a lead in taper cut 2740 into the ID of the nut. Installed in the walls of the taper are bullet catches 2750 at the end of each nut thread that pick up the thread groove in the lead screw and directs thread of the nut into the thread groove of the lead screw.

In some embodiments, the lead screw is made of steel alloy AISI series A-4320-M which is resistant to $H_2S$ corrosion. Bullet catches are inserts with a ball and spring that can retract without damaging the lead screw thread until the thread groove is centered on the ball. Because the nut can rotate unrestricted on bearings the alignment will be achievable. This guides the lead screw into the nut such that it is self-starting. In some embodiments the rotating heater tube is made of brass such that it is resistant to $H_2S$ corrosion. The bearings that hold the spinning tube and nut in bore are sealed such that sand or other contaminants cannot enter the gap between the magnet 2760 array and the spinning tube. The lead edge of the lead screw may be machined with a taper 2770 to help start the screw in the nut. The threads along the taper may diminish in height and come to a rounded point at their ends so that they can direct the bullet catch ball naturally into a thread groove of the lead screw.

In another embodiment of self-starting, the threads on the lead screw and the nut may diminish in height as they progress along the tapers of each item and are brought to a small rounded tip and this feature alone may allow the two articles to self-start without the installation of bullet catches. In some embodiments, self-starting may be generally defined as the ability of two machined parts to interact (e.g. begin threading) with little to no outside guidance typically associated with the interaction of the two machined parts by one skilled in the art.

The next element in the rod string is the anti-torque mechanism 2780 that prevents the rod string from twisting as the lead screw applies torque to the nut. The anti-torque member may have some polygonal cross section (e.g., a hexagon). A spool 2785 with a hexagonal passage may slide along the hex rod. The OD of the spool may be smaller than the minor diameter of the nut thread. This allows the spool to pass through the nut. D2, the pump diameter, and D3, the spool maximum diameter, may be less than D1, the minor thread diameter of the nut, to allow these items to pass through the nut. In the situation where there is more than one tool installed in the well the first lead screw and anti-torque mechanism passes through the tool bodies higher in the well until it reaches its intended location. At this point the rod to hex rod coupler engages the top of the spool applying force and spreading the spring loaded levers 2790 capturing the spool. The spool may have shallow grooves that capture a torque reaction feature on the lever. The levers may have light springs 2792 so as not to damage the seating cups as the pump passes through the levers in advance of the lead screw and anti-torque spool. Once the levers capture the spool it slides along the hex rod and the levers which are fastened to the tubing string react to the torque of the lead screw. The left lever in FIG. 27 is shown in the engaged position and the right lever is shown in a rocked back position where it would be displaced if the pump seating cups or the lead screw threads were passing.

The installation method may include the following embodiment. Tool housing may have a crossover swage 2795 that will allow the tool housing to connect to the tubing string. Tools may be installed at a depths where paraffin is forming. The lead screw and the anti-torque rods may be installed at the same spacing as the tool spacing in the tubing string. In general the lead screw and the anti-torque rod may be longer than the pump stroke allowing for inaccuracy make-up caused by rod and tubing stretch. The individual anti-torque spools may be held next to the lead screw with bullet catches 2798 installed in the hex rod above the spool. The lead screw may enter the nut and upon further advance the spool comes against the locking levers.

The bottom tool may have the strongest bullet catch so that this spool can make its way through upper tool levers without disengaging. Similarly, upper levers may have lighter springs than levers in lower tools, once again making sure spools get through upper tools without disengaging. In each spool the upper rim of the spool is a larger diameter than the lower rim. After the levers spring over the lower rim they then require more force to spread the levers over the larger diameter upper collar. Once the rod string reaches its mating tool housing the lever/bullet pair are matched so that there is adequate force to skip over the bullet catch at which time the levers latch onto the spool and it is free to slide up and down the anti-torque rod. Before installation measurements have been made so that the pump is close to the seating nipple as the spool engages. Because there is extra length in the lead screw and the anti-torque rod there is length to accommodate positioning error. The pump is then seated, the pump is spaced and pumping may begin.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An electromagnetic heating system for heating a wellbore and the fluids therein, comprising:
   one or more permanent magnets coupled to a down-well component of the wellbore;
   a metallic component positioned within the wellbore and magnetically coupled to the one or more permanent magnets;
   wherein, during use, the metallic component and/or the permanent magnets are moved in a manner such that a current is generated in the metallic component, causing the temperature of the wellbore and the fluids therein to increase;
   wherein the metallic component is coupled to a pump, positioned within the wellbore, such that a reciprocating motion of the pump causes the metallic component to rotate with respect to the one or more permanent magnets;
   a drive mechanism coupled to the pump, wherein the drive mechanism translates the linear motion of the pump into rotational movement of the metallic component, wherein the drive mechanism comprises:
      an engager comprising an opening which couples, during use, to a portion of an elongated member coupled to the pump, wherein the opening of the engager is threaded, wherein the portion of the elongated member comprises a threaded portion complementary to the threaded opening of the engager, and wherein the threaded portion is self-starting during use when the threaded portion engages the threaded opening.

2. The system of claim 1, wherein the engager comprises a lead in taper cut into an inner diameter of the threaded opening.

3. The system of claim 1, wherein the threaded portion comprises a tapered threading such that the threaded portion is self-starting during use when the threaded portion engages the threaded opening.

4. The system of claim 1, wherein the threaded portion comprises a tapered threading such that the threaded portion is self-starting during use when the threaded portion engages the threaded opening, and wherein threads along the taper diminish in height and come to a rounded point at their ends.

5. The system of claim 1, wherein the engager comprises at least one aligner which assists the threaded portion to self-start threading when engaging the engager.

6. The system of claim 1, wherein the engager comprises at least one aligner which assists the threaded portion to self-start threading when engaging the engager, and wherein the at least one aligner comprises a bullet catch.

7. The system of claim 1, further comprising bearings used to fix the engager.

8. The system of claim 1, wherein the drive mechanism translates the linear motion of the pump into rotational movement of the metallic component when the pump is moving in a first direction only.

9. The system of claim 1, wherein the during use, the metallic component and/or the permanent magnets are moved in a manner such that a current is generated in the metallic component, causing the temperature of the metallic component to increase.

10. The system of claim 1, wherein the metallic component rotates with respect to the one or more permanent magnets.

11. The system of claim 1, wherein the one or more permanent magnets rotate with respect to the metallic component.

12. The system of claim 1, wherein the one or more permanent magnets comprises a plurality of permanent magnets placed in a cylindrical arrangement having alternately placed north-south poles.

13. The system of claim 12, wherein the plurality of permanent magnets are placed in a Halbach array.

14. The system of claim 1, wherein the one or more permanent magnets comprises a plurality of permanent magnets placed in a linear arrangement having alternately placed north-south poles.

15. The system of claim 14, wherein the plurality of permanent magnets are placed in a Halbach array.

16. The system of claim 1, further comprising a downhole motor coupled to the metallic components and/or the magnets, wherein the downhole motor moves the metallic component and/or the permanent magnets in a manner such that a current is generated in the metallic component.

17. The system of claim 1, wherein the drive mechanism is coupled to the metallic component and/or the permanent magnets, wherein the drive mechanism utilizes fluid pressures within the wellbore to move the metallic component and/or the permanent magnets in a manner such that a current is generated in the metallic component.

18. The system of claim 1, wherein the drive mechanism is coupled to the metallic component and/or the permanent magnets, wherein the drive mechanism utilizes fluid velocities within the wellbore to move the metallic component and/or the permanent magnets in a manner such that a current is generated in the metallic component.

19. The system of claim 1, wherein the one or more permanent magnets are coupled to a tubing string of a downhole pump.

20. The system of claim 1, the one or more permanent magnets are magnetically coupled to a casing of a wellbore.

21. The system of claim 1, further comprising a torque coupling coupled to the pump, wherein the torque coupler transfers torque applied to the elongated member to a tubing string coupled to the drive mechanism.

22. A method of heating components within a wellbore comprising:
- placing an electromagnetic heating system into a wellbore; wherein the electromagnetic heating system comprises:
  - one or more permanent magnets coupled to a down-well component of the wellbore; and
  - a metallic component positioned within the wellbore and magnetically coupled to the one or more permanent magnets;
- moving the metallic component and/or the permanent magnets in a manner such that a current is generated in the metallic component causing the temperature of the wellbore and the fluids therein to increase;
- conveying a pump in a reciprocating manner such that the pump causes the metallic component to rotate with respect to the one or more permanent magnets, wherein the metallic component is coupled to the pump, positioned within the wellbore;
- translating, using a drive mechanism coupled to the pump, the linear motion of the pump into rotational movement of the metallic component, wherein translating the linear motion comprises:
  - coupling an opening of an engager to a portion of an elongated member coupled to the pump, wherein the opening of the engager is threaded, wherein the portion of the elongated member comprises a threaded portion complementary to the threaded opening of the engager, and wherein the threaded portion comprises a tapered threading such that the threaded portion is self-starting during use when the threaded portion engages the threaded opening.

\* \* \* \* \*